United States Patent
Hashimoto

(10) Patent No.: US 9,026,734 B2
(45) Date of Patent: May 5, 2015

(54) MEMORY SYSTEM AND DATA DELETING METHOD

(75) Inventor: Daisuke Hashimoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 799 days.

(21) Appl. No.: 13/312,129

(22) Filed: Dec. 6, 2011

(65) Prior Publication Data
US 2012/0144097 A1 Jun. 7, 2012

(30) Foreign Application Priority Data

Dec. 7, 2010 (JP) ................................ 2010-272171

(51) Int. Cl.
*G06F 13/00* (2006.01)
*G06F 12/00* (2006.01)
*G06F 12/02* (2006.01)
*G06F 12/08* (2006.01)

(52) U.S. Cl.
CPC ............ *G06F 12/0246* (2013.01); *G06F 12/08* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 8,122,193 B2* | 2/2012 | Song et al. | 711/117 |
| 8,230,159 B2 | 7/2012 | Stenfort | |
| 2008/0002469 A1* | 1/2008 | Ishimoto | 365/185.17 |
| 2008/0141043 A1* | 6/2008 | Flynn et al. | 713/193 |
| 2009/0125671 A1* | 5/2009 | Flynn et al. | 711/103 |
| 2010/0217927 A1 | 8/2010 | Song et al. | |
| 2010/0250829 A1 | 9/2010 | Stenfort | |
| 2010/0281080 A1 | 11/2010 | Rajaram et al. | |
| 2011/0022784 A1 | 1/2011 | Yano et al. | |
| 2012/0110249 A1 | 5/2012 | Hyojin et al. | |
| 2012/0221776 A1 | 8/2012 | Yoshihashi et al. | |
| 2012/0246388 A1* | 9/2012 | Hashimoto | 711/103 |
| 2012/0246393 A1 | 9/2012 | Hashimoto | |
| 2013/0060989 A1* | 3/2013 | Aune | 711/103 |

FOREIGN PATENT DOCUMENTS

| | | |
|---|---|---|
| JP | 5-27924 | 2/1993 |
| JP | 2002-123421 | 4/2002 |

(Continued)

OTHER PUBLICATIONS

U.S. Appl. No. 13/420,051, filed Mar. 14, 2012, Hida, et al.

(Continued)

*Primary Examiner* — Sean D Rossiter
(74) *Attorney, Agent, or Firm* — Oblon, McClelland, Maier & Neustadt, L.L.P.

(57) ABSTRACT

According to one embodiment, a memory system includes: a memory area; a transfer processing unit that stores write data received from a host apparatus in the memory area; a delete notification buffer that accumulates a delete notification; and a delete notification processing unit. The delete notification processing unit collectively reads out a plurality of delete notifications from the delete notification buffer and classifies the read-out delete notifications for each unit area. The delete notification processing unit sequentially executes, for each unit area, processing for collectively invalidating write data related to one or more delete notifications classified in a same unit area and, in executing processing for one unit area in the processing sequentially executed for the each unit area, invalidates all write data stored in the one unit area after copying write data excluding write data to be invalidated stored in the one unit area to another unit area.

20 Claims, 18 Drawing Sheets

(56) References Cited

FOREIGN PATENT DOCUMENTS

| | | |
|---|---|---|
| JP | 2002-324044 | 11/2002 |
| JP | 2009-205689 | 9/2009 |

OTHER PUBLICATIONS

U.S. Appl. No. 13/420,808, filed Mar. 15, 2012, Hashimoto.
U.S. Appl. No. 13/242,482, filed Sep. 23, 2011, Nishikubo.
Curtis E. Stevens, T13 Technical Editor, "Information Technology—ATA/ATAPI Command Set—2 (ACS-2)", Working Draft Project American National Standard, T13/2015-D, Revision 1, Jan. 21, 2009, 22 Pages.
"ATA/ATAPI Command Set-2 (ACS-2)", T13/2015-D, Revision 6, Working Draft Project American National Standard, http://www.t13.org ,Feb. 22, 2011, pp. 50, 98-99 with cover page.
"SCSI Block Commands-3 (SBC-3)", T10/BSR Incits 514, Revision 35, Working Draft American National Standard, http://www.t10.org ,Dec. 7, 2012, pp. 162-166 with cover page.
"NVM Express" Revision 1.1, http://www.nvmexpress.org/, Oct. 11, 2012, pp. 114-117 with cover page.

\* cited by examiner

FIG.3

| START LBA | NUMBER OF SECTORS |
|---|---|
| 0x35 | 2 |
| 0x45 | 32 |
| ⋮ | ⋮ |

| LBA | PHYSICAL ADDRESS | |
|---|---|---|
| ⋮ | ⋮ | } PHYSICAL ADDRESS OF CACHE REGION |
| ⋮ | ⋮ | } PHYSICAL ADDRESS OF STORAGE REGION | ns
MEMORY SYSTEM AND DATA DELETING METHOD

CROSS-REFERENCE TO RELATED APPLICATIONS

This application is based upon and claims the benefit of priority from the prior Japanese Patent Application No. 2010-272171, filed on Dec. 7, 2010; the entire contents of which are incorporated herein by reference.

FIELD

Embodiments described herein relate generally to a memory system and a data deleting method.

BACKGROUND

A connection protocol between a host apparatus and a memory system is well known. For example, when deleting data on an operating system (OS) of the host apparatus, management information associated with the data is simply deleted on the OS and data itself is not actually deleted in the memory system. In the case where a hard disk drive (HDD) is adopted as the memory system, data stored in the memory system is not always deleted every time when data is deleted on the OS. Therefore, performance of the host apparatus is improved.

However, according to the above connection protocol, data that should have been deleted on the OS may be still recognized as valid data on the memory system (such data is hereinafter referred to as "host-invalid and device-valid data"). Therefore, actual free areas in the memory system may be fewer than free areas recognized by the OS and thereby the free areas of the memory system tend to be exhausted. In the case where a solid state drive (SSD) including a flash memory (flash EEPROM) is adopted as the memory system, the exhaustion of the free areas will cause performance deterioration.

To solve this problem, in recent years, a connection protocol in which the OS notifies the memory system of memory areas unnecessary for the OS has been developed. The SSD may prevent the exhaustion of the free areas due to an increase in host-invalid and device-valid data by deleting data stored in the memory area designated by the notification (a delete notification).

BRIEF DESCRIPTION OF THE DRAWINGS

FIG. 3 is a diagram for explaining the data structure of a delete notification buffer;
FIG. 4 is a diagram for explaining an example of the data structure of an address management table.

DETAILED DESCRIPTION

In general, according to one embodiment, a memory system includes: a nonvolatile memory including a memory area; a transfer processing unit that stores write data in the memory area; a delete notification buffer that accumulates and stores a delete notification that designates unnecessary write data; and a delete notification processing unit that invalidates the write data designated by the delete notification. The delete notification processing unit collectively reads out a plurality of delete notifications from the delete notification buffer, classifies the delete notifications for each processing unit area smaller than the memory area, and executes, for each processing unit area, processing for collectively invalidating write data designated by the delete notifications classified in the same unit area. When the delete notification processing unit executes processing for one processing unit area, after copying write data excluding write data to be invalidated to another processing unit area, the delete notification processing unit invalidates all write data stored in the one processing unit area.

Exemplary embodiments of a memory system and a data deleting method will be explained below in detail with reference to the accompanying drawings. The present invention is not limited to the following embodiments.

First Embodiment

Figure 1:
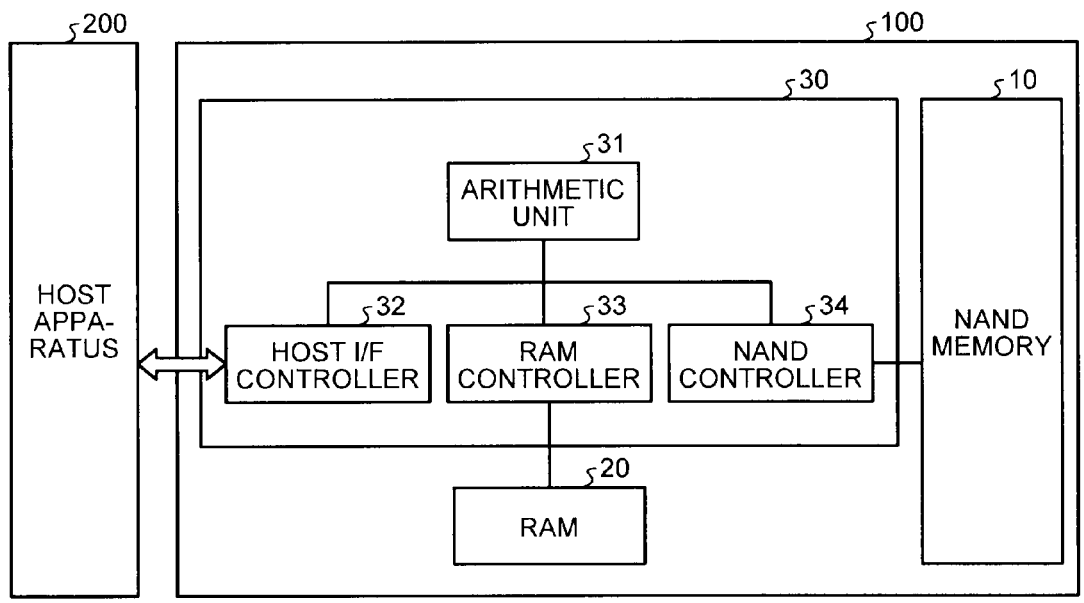
FIG. 1 is a diagram of the configuration of an SSD to which a memory system according to a first embodiment is applied.

FIG. 1 is a diagram of the configuration of an SSD to which a memory system according to a first embodiment is applied. As shown in the figure, an SSD 100 is connected to a host apparatus (Host) 200 such as a personal computer and functions as an external storage of the host apparatus 200. As an example, the host apparatus 200 and the SSD 100 are connected by a communication interface conforming to the Advanced Technology Attachment (ATA) standard. A write request, a readout request and a delete notification are provided to the SSD 100 from the host apparatus 200. The write request, the readout request and the delete notification include a start address of an access target area defined by LBA (Logical Block Addressing) and a logical sector size indicating a range of the access target area. Besides, as an another example of the communication interface, a serial attached SCSI (SAS), PCI Express, Thunderbolt (trademark) or a universal serial bus (USB) interface may be used.

Hereinafter, data which is invalid for the Host 200 (an OS) but is valid for a device (the SSD 100) is referred to as "host-invalid and device-valid data".

Data which is valid for the Host 200 and the SSD 100 is referred to as "host-valid and device-valid data".

Data which is valid for the Host 200 but is invalid for the SSD 100 is referred to as "host-valid and device-invalid data".

Data which is invalid for the Host 200 and the SSD 100 is referred to as "host-invalid and device-invalid data".

Data which is valid at least for the Host 200 is referred to as "host-valid data".

Data which is invalid at least for the Host 200 is referred to as "host-invalid data".

Data which is valid at least for the SSD 100 is referred to as "device-valid data".

Data which is invalid at least for the SSD 100 is referred to as "device-invalid data".

The SSD 100 includes a NAND type flash memory (hereinafter abbreviated as NAND memory) 10 functioning as a nonvolatile semiconductor memory, a random access memory (RAM) 20 functioning as a cache memory or the like, and a drive control circuit 30 that performs data transfer control between the host apparatus 200 and the NAND memory 10 via the RAM 20 and controls various components in the SSD 100.

A memory cell transistor included in a memory cell array of the NAND memory 10 includes a metal oxide semiconductor field effect transistor (MOSFET) including a laminated gate structure formed on a semiconductor substrate. The laminated gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons stored in the floating gate electrode. The memory cell transistor stores data according to a difference in the threshold voltage.

The memory cell transistor may be configured to store one bit or may be configured to store multiple bits (data equal to or larger than two bits). A structure of the memory cell transistor is not limited to the structure including the floating gate electrode. For example, a memory cell transistor of a metal-oxide-nitride-oxide-silicon (MONOS) type that can change a threshold voltage by trapping electrons in the nitride layer functioning as the charge storage layer may be used. The MONOS memory cell transistor may also be configured to store one bit or may be configured to store multiple bits. Memory cells may be arranged three-dimensionally as described in the United States Patent Application Publication Nos. 2010/0172189 and 2010/0254191 may be used.

As the RAM 20, a dynamic random access memory (DRAM), a static random access memory (SRAM), a ferroelectric random access memory (FeRAM), a magnetoresistive random access memory (MRAM), a phase change random access memory (PRAM) or the like may be used. The RAM 20 may be included in the drive control circuit 30 or may be disposed outside of the drive control circuit 30.

The drive control circuit 30 includes an arithmetic unit 31 that executes control of the entire drive control circuit 30 based on firmware. The drive control circuit 30 further includes a host interface controller (host I/F controller) 32 that executes control of the communication interface between the SSD 100 and the host apparatus 200, a RAM controller 33 that controls writing and readout of data in and from the RAM 20, and a NAND controller 34 that executes control of data transfer between the NAND memory 10 and the RAM 20.

The delete notification is a command transmitted from the host apparatus 200 to the SSD 100 when deletion of data is executed in the OS on the host apparatus 200. Examples of the delete notification include 06h DATA SET MANAGEMENT command (commonly referred to as trim command) described in INCITS ATA/ATAPI Command Set-2 (ACS-2). This command notifies, from the OS of the host apparatus, a storage device of memory areas unnecessary for the OS (memory areas of host-invalid data). In other words, when data is deleted on the OS, this command notifies the storage device of memory areas (LBA areas) in which the host-invalid data is present as an LBA range entry including a set of an LBA (a start LBA) and a logical sector size (a number of logical sectors). A command defined by another standard may be used as the delete notification as long as the command includes the same content. For example, the delete notification may be realized by other commands such as SCT command transport described in INCITS ACS-2 and other commands peculiar to vendors.

If the SSD 100 always deletes data stored in memory areas designated by the delete notification (delete designation areas) every time when receiving the delete notification, the host apparatus 200 cannot transmit another request to the SSD 100 until the host apparatus 200 receives an acknowledgement corresponding to the delete notification. Therefore, efficient communication between the SSD 100 and the host apparatus 200 cannot be realized.

Furthermore, if the SSD 100 individually executes respective delete notification, free areas in the SSD 100 are gradually fragmented. Consequently, it takes time to search for the free areas to write data. At the same time, because write data is dividedly written over a plurality of free areas, it also takes time to readout data. In other words, if the delete processing is executed every time when receiving the delete notification, the deterioration in communication efficiency between the SSD 100 and the host apparatus 200 may be caused.

Therefore, in the embodiment of the present invention, the SSD 100 accumulates the received delete notifications in a buffer and then, sequentially processes the delete notifications accumulated in the buffer when a predetermined condition is satisfied. In processing the delete notifications, the SSD 100 may rearrange data to prevent the fragmentation of the free areas.

Figure 2:
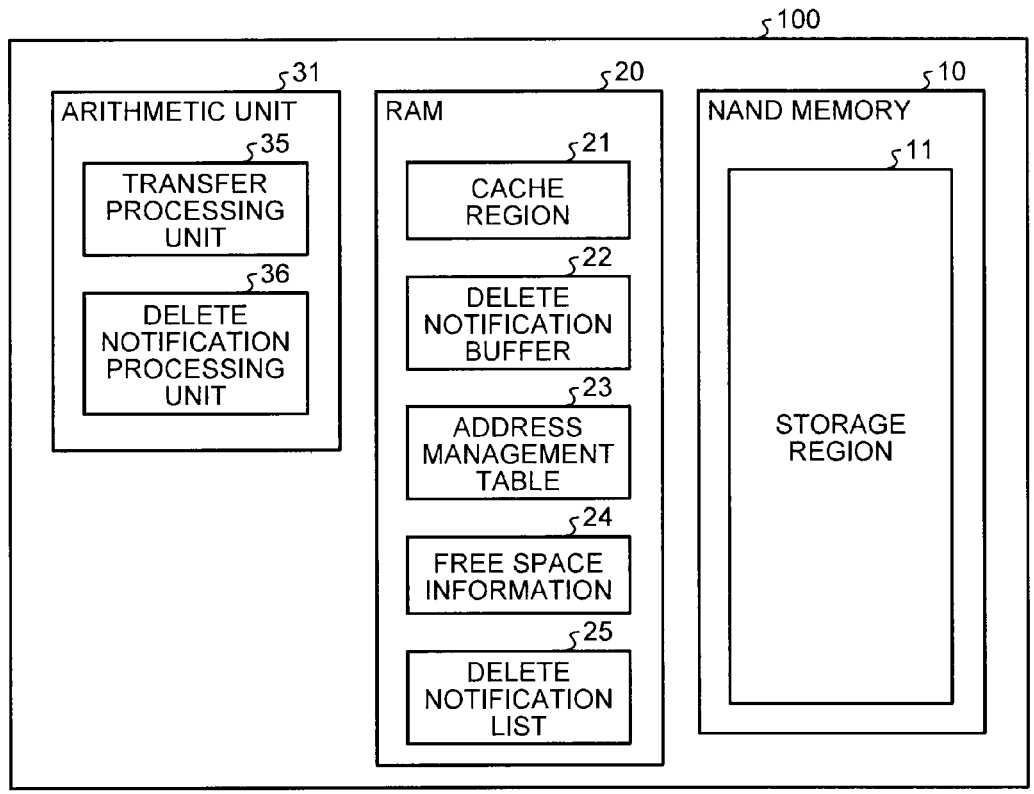
FIG. 2 is a diagram for explaining a functional configuration of the SSD.

FIG. 2 is a diagram for explaining a functional configuration of the SSD 100. As shown in the figure, a cache region 21 for caching data from the host apparatus 200 is provided in the RAM 20. A storage region 11 for storing data transferred from the cache region 21 is provided in the NAND memory 10. Data associated with the write request from the host apparatus 200 is written in the storage region 11 via the cache region 21. A delete notification buffer 22 for temporarily accumulating the delete notifications is provided in the RAM 20.

FIG. 3 is a diagram for explaining the data structure of the delete notification buffer 22. As shown in the figure, the delete notification buffer 22 includes a table structure in which contents (the start LBA and the number of logical sectors) of the delete notification are sequentially registered as entries.

The arithmetic unit 31 includes a transfer processing unit 35 and a delete notification processing unit 36. When the write request is provided from the host apparatus 200, the transfer processing unit 35 writes data in the cache region 21.

When the write request designates a memory area corresponding to memory areas designated by at least one of the delete notifications accumulated in the delete notification buffer 22, the transfer processing unit 35 clears the corresponding delete notification.

When the readout request is provided from the host apparatus 200, the transfer processing unit 35 reads out data from the cache region 21 or the storage region 11 and transfers the data to the host apparatus 200. When the cache region 21 overflows or when a power supply is turned off, the transfer processing unit 35 saves the data cached in the cache region 21 in the storage region 11. In another embodiment, the transfer processing unit 35 may directly write data in the storage region 11 without caching data in the cache region 21.

To evenly distributing the number of times of erasing (or the number of times of writing) in the storage region 11, the transfer processing unit 35 executes static wear leveling for appropriately changing a writing position (a physical address at a writing destination) when writing data in the storage region 11 or dynamic wear leveling for reading out data already written in the storage region 11 and moving the data to another position in the storage region 11.

A correspondence relationship between an LBA of the host apparatus 200 and physical address of the storage region 11 changes every time when the static and dynamic wear leveling are executed. The transfer processing unit 35 manages the correspondence relationship by using an address management table 23.

FIG. 4 is a diagram for explaining an example of the data structure of the address management table 23. As shown in the figure, entries indicating a correspondence relationship between an LBA and a physical address are registered separately for the cache region 21 and the storage region 11. For example, the respective entries of the address management table 23 are registered by a logical sector unit. The entries of the address management table 23 may be registered by a cluster unit or a track unit which are larger than the logical sector unit. When the data write-requested by the host apparatus 200 is written in the cache region 21, when the data cached in the cache region 21 is saved in the storage region 11, and during execution of the dynamic wear leveling, the transfer processing unit 35 updates the address management table 23. The address management table 23 is stored on the RAM 20 and successively updated on the RAM 20.

The address management table 23 need not to be divided and stored separately into the entries for the storage region 11 and the entries for the cache region 21 if the transfer processing unit 35 can distinguish and recognize a range of physical addresses allocated to the cache region 21 and a range of physical addresses allocated to the storage region 11. Instead of associating the LBA and the physical address for each uniform size determined in advance, the LBA and the physical address may be associated for a variable logical sector size by storing the logical sector size for each element in address management table 23.

The transfer processing unit 35 calculates free areas in the storage region 11 for each predetermined area (processing unit area) based on the address management table 23 and generates free area information 24 in which the size of free areas is described for each processing unit area. For example, the transfer processing unit 35 updates the free area information 24 when contents of the address management table 23 are changed.

When the delete notification buffer 22 overflows, the delete notification processing unit 36 generates a delete notification list 25 in which the delete notifications accumulated in the delete notification buffer 22 are classified for each processing unit area. The delete notification processing unit 36 sequentially invalidates data stored in delete designation areas related to the delete notifications for each processing unit area based on the generated delete notification list 25.

The delete notification-processing unit 36 determines whether data not to be invalidated (host-valid data) in the target processing unit area can be copied to free areas of another processing unit area by referring to the free area information 24. If the host-valid data can be copied, the delete notification processing unit 36 copies the host-valid data. After copying the host-valid data, the delete notification processing unit 36 invalidates data stored in the entire target processing unit area.

The delete notification processing unit 36 updates the address management table 23 after copying the host-valid data. Thus the host-invalid data which is designated by the delete notifications becomes device-invalid data (host-invalid and device-invalid data), and the host-valid data which is not designated by the delete notifications is kept to be device-valid data (host-valid and device-valid data).

The NAND memory 10 includes a plurality of blocks larger than the logical sector. The block is a unit of data erasing in the NAND memory 10. Each of the blocks includes a plurality of pages. The page is a minimum unit of data writing and readout in the NAND memory 10. For example, the processing unit area includes N blocks (N is a natural number equal to or larger than 1) in terms of processing efficiency. Besides, the processing unit area may include N pages (N is a natural number equal to or larger than 1).

The term "invalidation" means deleting a line whose LBA field value is included in the delete designation LBA area from the address management table 23. However, a delete designation area may be invalidated by rewriting a physical address field of a line whose LBA field value is included in the delete designation LBA area with an invalid physical address or by rewriting a LBA field whose value is included in the delete designation LBA area with an invalid LBA address to invalidate the entry.

If invalidated processing unit areas are increased, the performance of the SSD 100 may be improved because blocks usable for the wear leveling increase and blocks usable for writing data increase. As a result, the performance of the SSD 100 is expected to improve.

The operation of the SSD 100 according to the first embodiment of the present invention is explained.

Figure 5:
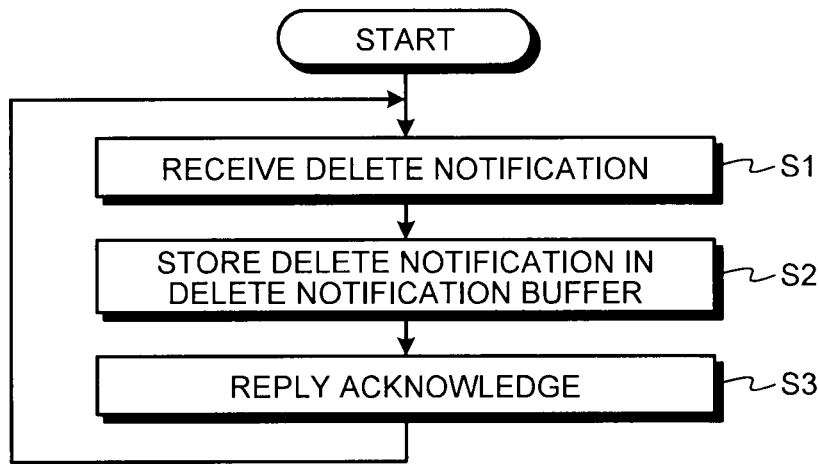
FIG. 5 is a flowchart for explaining the operation of the SSD according to the first embodiment performed when the SSD receives a delete notification.

FIG. 5 is a flowchart for explaining the operation of the SSD 100 performed when the SSD 100 receives a delete notification. As shown in the figure, when a delete notification command is received from the host apparatus 200 (step S1), the host I/F controller 32 stores the received delete notification in the delete notification buffer 22 (step S2).

After storing the delete notification, the host I/F controller 32 replies an acknowledgement of the delete notification to the host apparatus 200 (step S3) and shifts to step S1. The host I/F controller 32 may reply the acknowledgement of the delete notification before finishing of storing the delete notification in the delete notification buffer 22.

Figure 6:
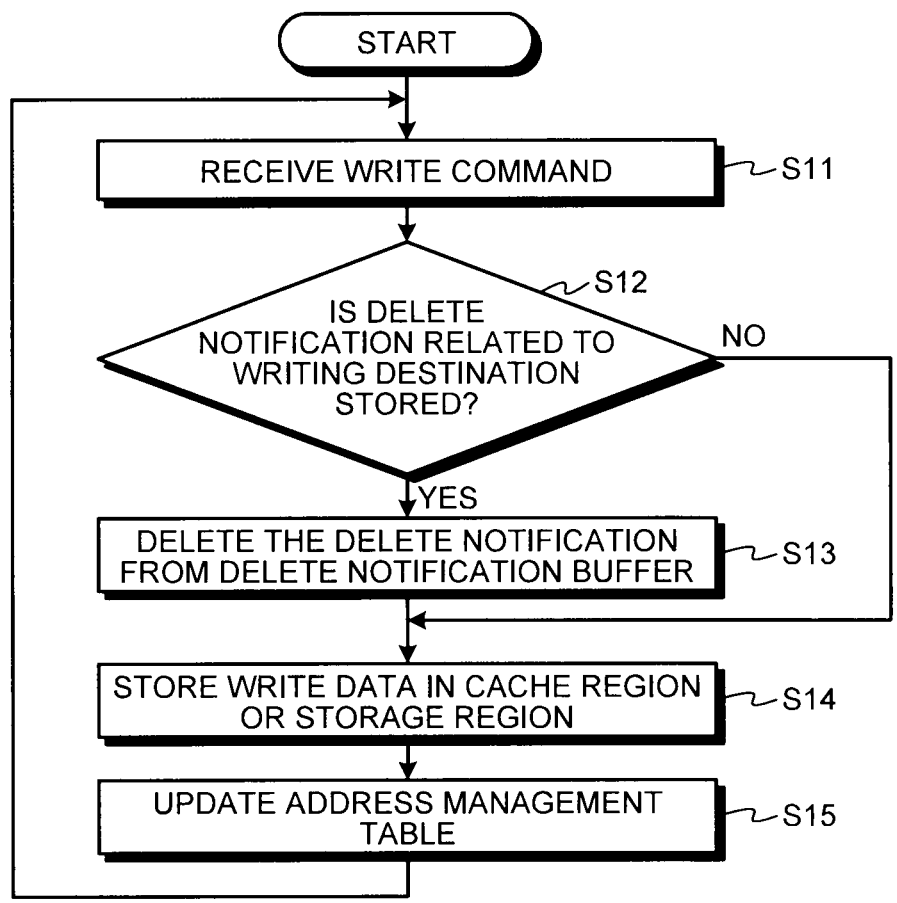
FIG. 6 is a flowchart for explaining the operation of the SSD according to the first embodiment performed when the SSD receives a write request.

FIG. 6 is a flowchart for explaining the operation of the SSD 100 performed when the SSD 100 receives a write request. As shown in the figure, when the host I/F controller 32 receives a write request (step S11), the write request is transferred to the transfer processing unit 35. The transfer processing unit 35 determines whether a delete notification related to the writing destination is stored in the delete notification buffer 22 or not by reading the delete notification buffer 22 (step S12). When the delete notification related to the writing destination is stored in the delete notification buffer 22 (Yes at step S12), the transfer processing unit 35 clears the delete notification from the delete notification buffer 22 (step S13) and stores write data in the cache region 21 or the storage region 11 (step S14).

When an LBA area designated by a delete notification and an LBA area of the writing destination requested by the write request partially overlap, the transfer processing unit 35 may rewrite the start LBA field and the number of logical sectors field of the delete notification to exclude the overlapping part of the LBA area rather than clearing the delete notification at step S13.

For example, when the delete notification buffer 22 stores a delete notification, the start LBA of which is 0×10 and the number of logical sectors of which is two (2) and when the SSD 100 receives a write request, the start LBA of which is 0×11 and the number of logical sectors of which is two (2), an area for one logical sector from 0×11 is an overlapping area.

In that case, the transfer processing unit 35 overwrites the delete notification, the start LBA of which is 0×10 and the number of logical sectors of which is two (2), with a delete notification, the start LBA of which is 0×10 and the number of logical sectors of which is one (1).

When the delete notification buffer 22 stores a delete notification, the start LBA of which is 0×10 and the number of logical sectors of which is nine (9) and when the SSD 100 receives a write request, the start LBA of which is 0×13 and the number of logical sectors of which is two (2), an area for two logical sectors from the start LBA 0×13 is an overlapping area.

In that case, the transfer processing unit 35 clears the delete notification and generates new two delete notification entries in the delete notification buffer 22. One of the two new entries includes the start LBA which equals to 0×00 and the number of logical sectors which equals to three (3), and the other includes the start LBA which equals to 0×15 and the number of logical sectors which equals to four (4).

When the delete notification related to the writing destination is not stored in the delete notification buffer 22 at step S12 (No at step S12), the transfer processing unit 35 shifts to step S14 and stores the write data in the cache region 21 or the storage region 11 (step S14). After step S14, the transfer processing unit 35 updates the address management table 23 (step S15) and shifts to step S11.

Figure 7:
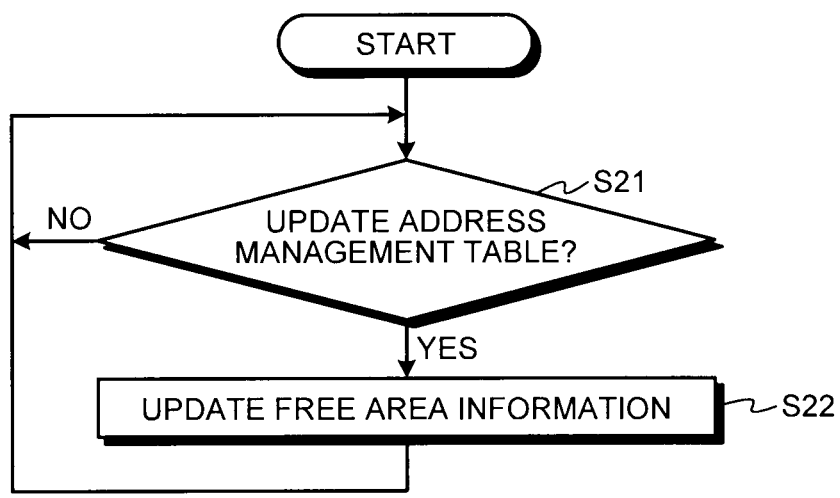
FIG. 7 is a flowchart for explaining the operation of the SSD according to the first embodiment related to update of free area information.

FIG. 7 is a flowchart for explaining the operation of the SSD 100 related to update of the free area information 24. As shown in the figure, the transfer processing unit 35 monitors update of the address management table 23 (step S21). When the address management table 23 is updated (Yes at step S21), the transfer processing unit 35 updates the free area information 24 (step S22). After updating the free area information 24, the transfer processing unit 35 shifts to step S21 and monitors update of the address management table 23.

Figure 8:
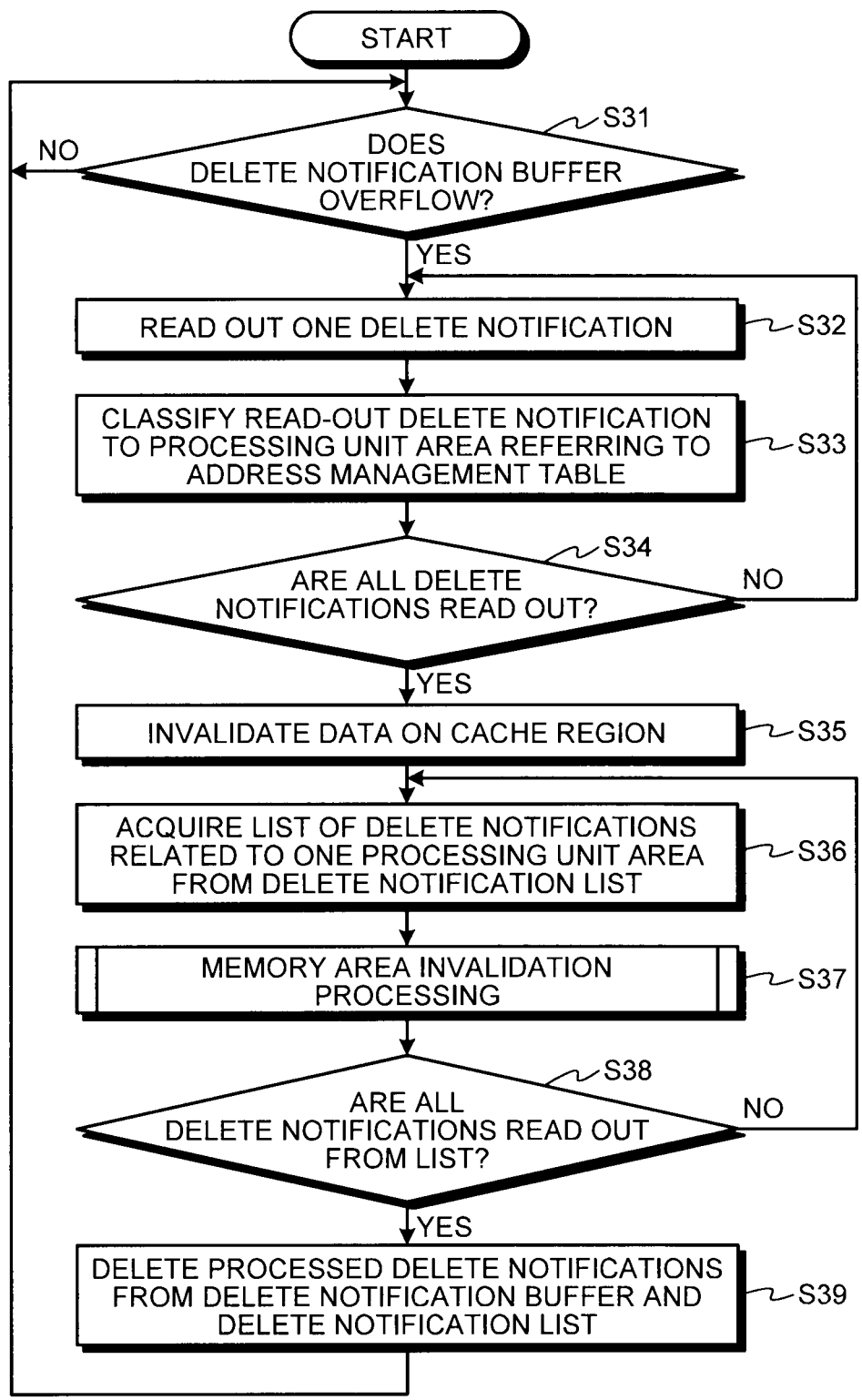
FIG. 8 is a flowchart for explaining the operation of the SSD according to the first embodiment in processing the delete notification.

FIG. 8 is a flowchart for explaining the operation of the SSD 100 in processing a delete notification. As shown in the figure, the delete notification processing unit 36 determines whether the delete notification buffer 22 overflows (step S31).

When the delete notification buffer 22 does not overflow (No at step S31), the delete notification processing unit 36 shifts to step S31 and repeats determination processing until the delete notification buffer 22 overflows.

When the delete notification buffer overflows (Yes at step S31), the delete notification processing unit 36 reads out one delete notification from the delete notification buffer 22 and classifies the read-out delete notification into a processing unit area to which a delete designation area related to the delete notification belongs by referring to the address management table 23(step S33). A classification result is sequentially added to a list for each processing unit area of classification destinations of the delete notification list 25.

The delete notification processing unit 36 determines whether all delete notifications are read out (step S34). When some delete notifications are not read out yet (No at step S34), the delete notification processing unit 36 shifts to step S32 and reads out one of the delete notification not read out yet. In this way, the delete notification processing unit 36 executes loop processing of steps S32 to S34 to thereby create the delete notification list 25.

The delete notification processing unit 36 classifies a delete notification, a delete designation area of which is an area in the cache region 21, in the cache region 21. When the delete notification processing unit 36 classifies the delete notification, the delete notification processing unit 36 calculates a physical address from an LBA address of the delete notification by referring to the address management table 23.

When no delete notification not read out yet remains (Yes at step S34), the delete notification processing unit 36 reads out the delete notification classified into the cache region 21 in the created delete notification list 25 and invalidates data on the cache region 21 designated by the delete notification classified into the cache region 21 (step S35).

The delete notification processing unit 36 reads out a list of delete notifications related to one processing unit area from the delete notification list 25 (step S36) and, invalidate data on the storage region 11 based on the delete notifications (step S37).

Figure 9:
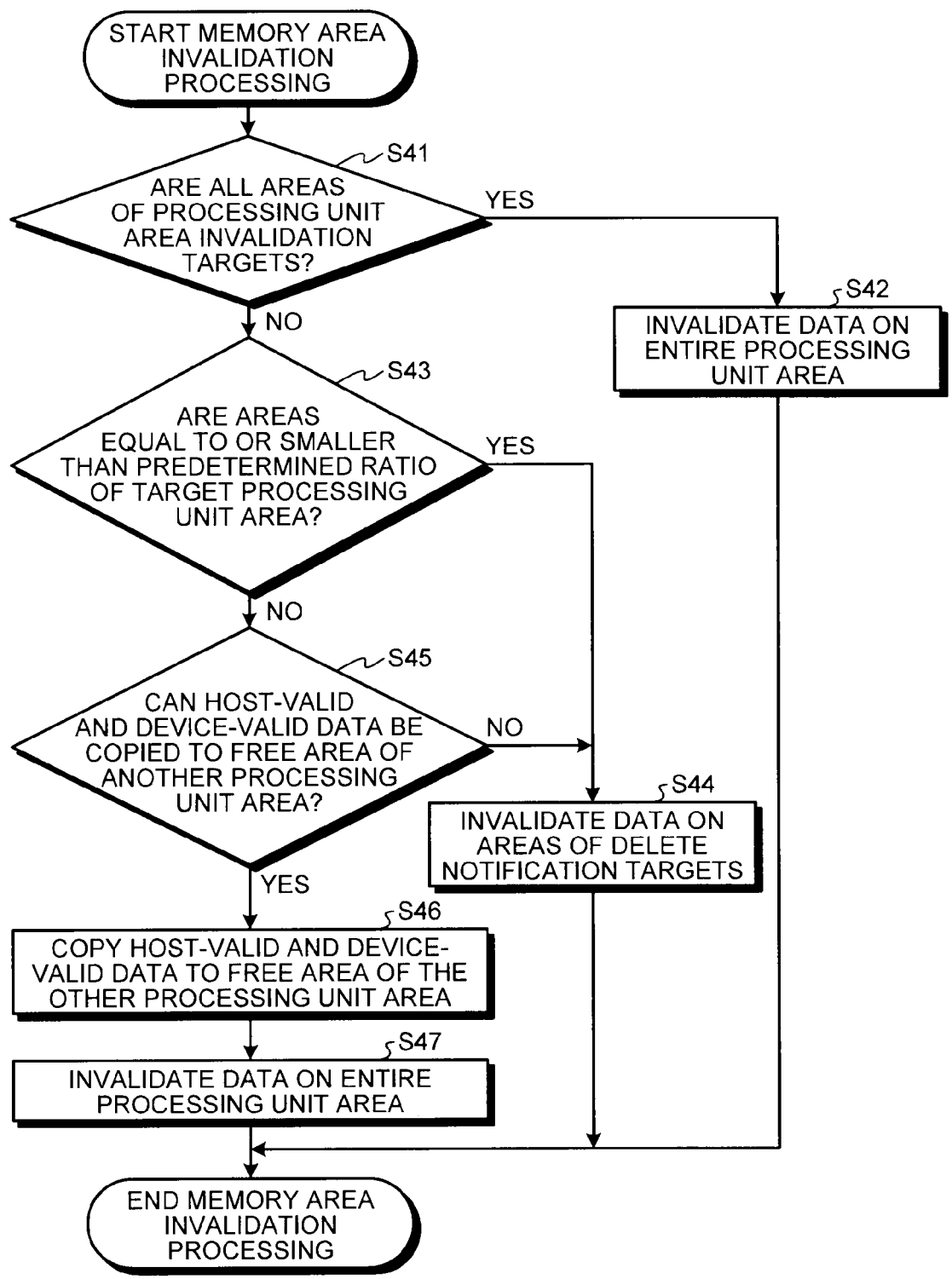
FIG. 9 is a flowchart for explaining more in detail memory area invalidation processing by the SSD according to the first embodiment.

FIG. 9 is a flowchart for explaining the memory area invalidation processing more in detail. As shown in the figure, the delete notification processing unit 36 determines whether all the data of the processing unit area related to the delete notification list 25 are invalidation targets (step S41). When all of the data of the entire area of the said processing unit area (target processing unit area) are invalidation target (Yes at step S41), the delete notification processing unit 36 invalidates all of the data of the entire area of the processing unit area (step S42). After step S42, the memory area invalidation processing ends.

Figure 10:
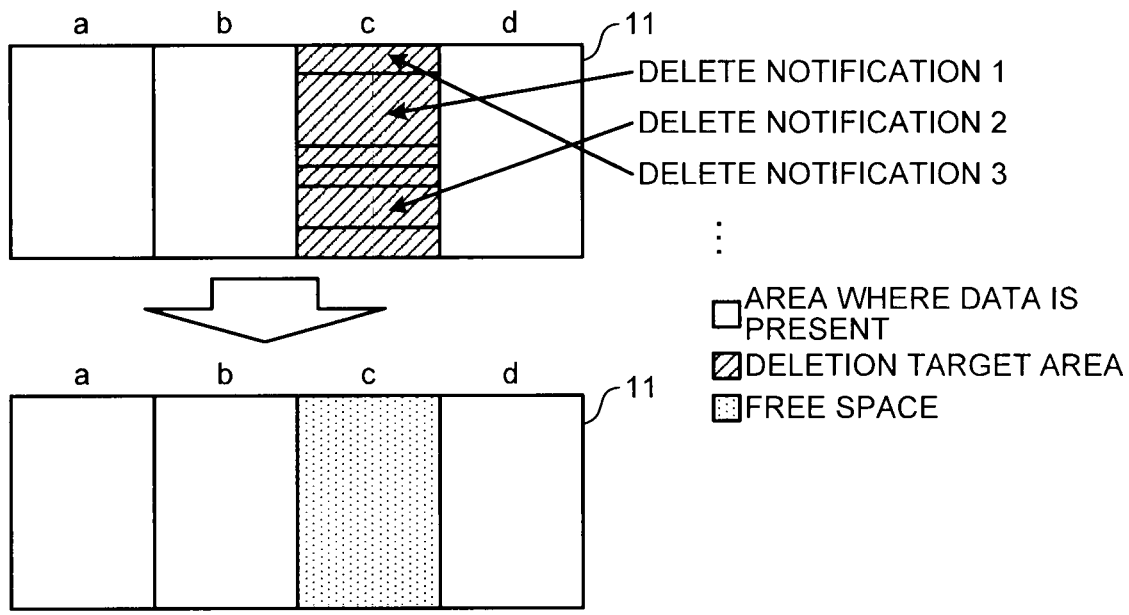
FIG. 10 is a diagram for explaining a state in which an entire processing unit area is invalidated.

FIG. 10 is a diagram for explaining how all of the data of the entire area of the processing unit area is invalidated at step S42. As shown in the FIG. 10, when data is stored in an entire processing unit area "c" among processing unit areas "a" to "d" and when the entire processing unit area "c" is set as a delete designation area by a plurality of delete notifications 1 to n in which parts of the processing unit area "c" are respectively set as delete designation areas, all of the data of the entire area of the processing unit area "c" is collectively invalidated. Consequently, it is possible to efficiently process the delete notifications compared with processing for individually invalidating delete designation areas corresponding to the delete notifications 1 to n.

When a part of the processing unit area is an invalidation target (No at step S41), the deletion-notification processing unit 36 determines whether areas equal to or smaller than a predetermined ratio of the target processing unit area (i.e., an invalidation target) (step S43). When the invalidation target areas equal to or smaller than the predetermined ratio of the target processing unit area (Yes at step S43), the delete notification processing unit 36 invalidates data on the invalidation target areas (step S44). After step S44, the memory area invalidation processing ends.

Figure 11:
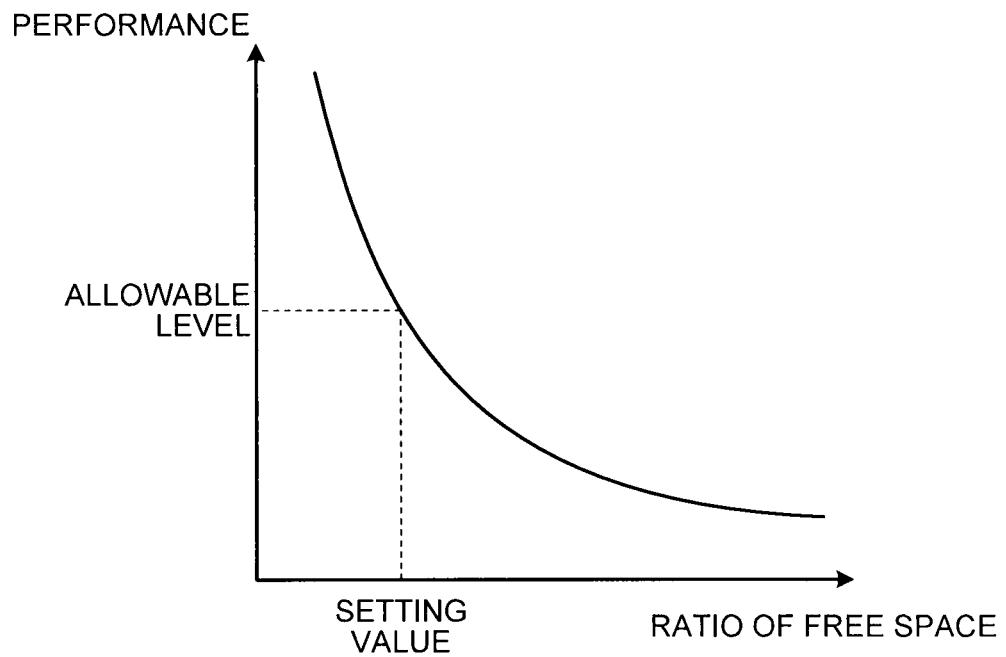
FIG. 11 is a diagram for explaining an example of a relation between a ratio of free area in each processing unit area and performance.

The predetermined ratio used for the determination processing at step S43 may be set in any way. For example, a relation between a ratio of free areas for each processing unit area and performance shown in FIG. 11 may be calculated by simulation or the like and the ratio may be set to the value corresponding to an allowable performance level by referring to the relation. A ratio at which efficiency of wear leveling is at an allowable level in a relation between the efficiency of the wear leveling and the ratio of the free areas may be set.

When invalidation target areas are exceeding the predetermined ratio of the target processing unit area (No at step S43), the delete notification processing unit 36 determines whether there is area which has enough size of free areas to store the host-valid data of the target processing unit area among the processing unit areas other than the target processing unit area by referring to the free area information 24 (step S45).

When there is not an area which has enough size of free areas to store the host-valid data of the target processing unit area (e.g. the size of free areas in the processing unit areas other than the target processing unit area is small) (No at step S45), the delete notification processing unit 36 shifts to step S44 and invalidates data on the invalidation target areas of the target processing unit area.

When there is an area which has enough size of free areas to store the host-valid data of the target processing unit area (Yes at step S45), the delete notification processing unit 36 copies the host-valid data to the free areas in the processing unit areas other than the target processing unit area (step S46) and invalidates all of the data of the entire area of the target processing unit area (step S47). After step S47, the memory area invalidation processing ends.

Figure 12:
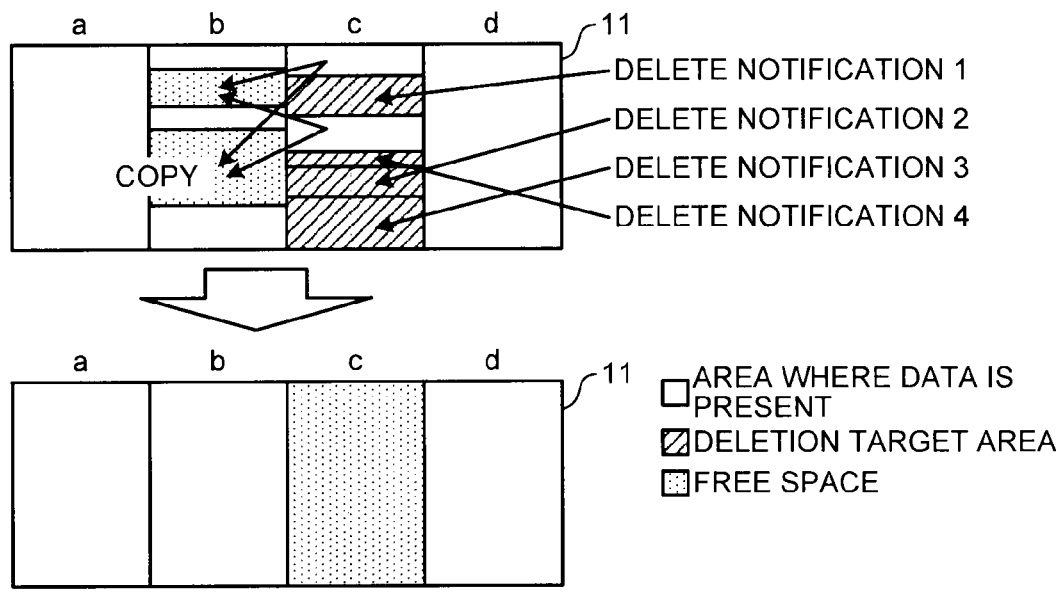
FIG. 12 is a diagram for explaining a state in which the entire processing unit area is invalidated.

FIG. 12 is a diagram for explaining how all of the data of the entire area of the target processing unit area is invalidated at steps S46 and S47.

As shown in FIG. 12, the valid data is copied to the free areas of the processing unit area "b" and the entire processing unit area "c" is invalidated when the size of device-valid data remaining after invalidation by the delete notifications 1 to 4 in the target processing unit area "c" among the processing unit areas "a" to "d" is equal to or smaller than the size of free areas of the processing unit area "b" (for example, both the sizes are equal in FIG. 12).

Transfer efficiency of the SSD 100 is deteriorated because four separate free areas remain in the processing unit areas "b" and "c" when the invalidation target area is simply invalidated without executing steps S46 and S47. On the other hand, this embodiment enables SSD 100 to prevent deterioration in transfer efficiency due to fragmentation of the free areas because the free areas are united into one free area as shown in FIG. 12 by executing steps S46 and S47.

Referring back to FIG. 8, after the memory area invalidation processing (step S37), the delete notification processing unit 36 determines whether all delete notifications for each processing unit area are read out from the delete notification list 25 (step S38). When there are delete notifications not read out yet (No at step S38), the delete notification processing unit 36 shifts to step S36 and reads out a list of delete notifications related to the subsequent processing unit area from the delete notification list 25.

When all the delete notifications for each processing unit area are read out (Yes at step S38), the delete notification processing unit 36 clears the already processed delete notifications from the delete notification buffer 22 and clears a list of the already processed delete notifications for each processing area from the delete notification list 25 (step S39). After step S39, the delete notification processing unit 36 shifts to step S31.

Figure 13:
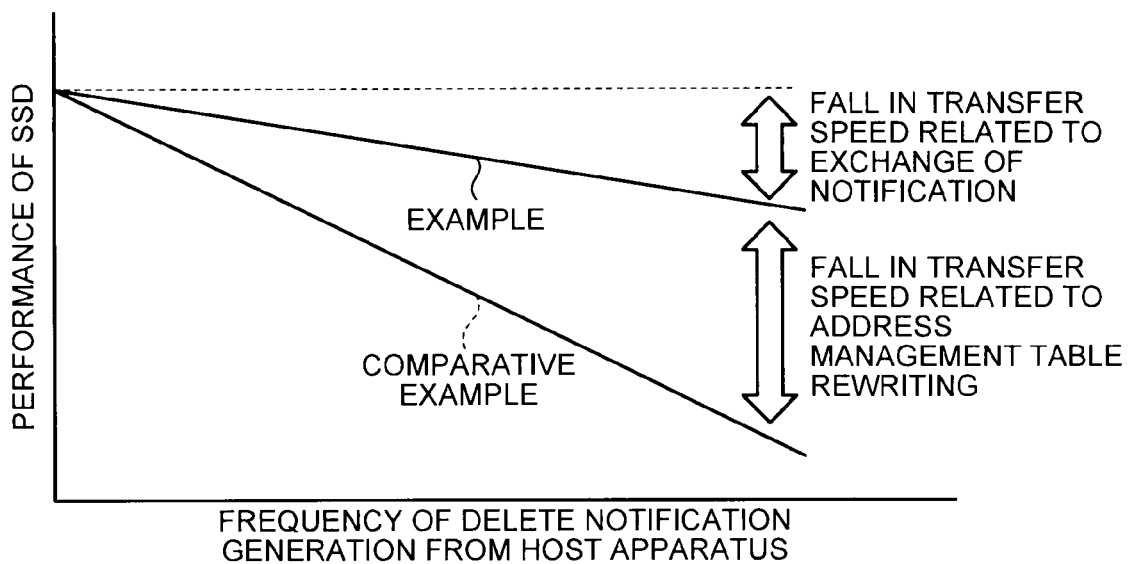
FIG. 13 is a diagram for explaining one of effects in the first embodiment.

FIG. 13 is a diagram for explaining one of effects in the first embodiment of the present invention. FIG. 13 compares the first embodiment (an example) to the conventional example that a delete notification is processed every time when the delete notification is received (hereinafter referred to as comparative example).

As shown in FIG. 13, transfer speed deteriorates by a total of a deterioration caused by sending and receiving of the delete notification and a deterioration caused by rewriting of the address management table 25 in the comparative example because the delete notification is processed after an address management table is rewritten when a delete notification is received.

The deterioration in the transfer speed increase according to an increase in a frequency of receiving delete notifications from the host apparatus 200. On the other hand, the deterioration in transfer speed is caused mainly by sending and receiving of the delete notification in the first embodiment because the delete notifications are collectively processed when the delete notification buffer 22 overflows.

Therefore, it is possible to reduce deterioration in transfer speed according to the first embodiment compared with the comparative example even if the frequency of receiving delete notifications from the host apparatus 200 increases.

In the above explanation, the processing of delete notifications is started when the delete notification buffer 22 overflows with the delete notifications. However, the delete processing may be started when a predetermined amount of delete notifications are accumulated rather than when the delete notification buffer 22 overflows.

In the memory area invalidation processing, the specific way to select a processing target area at a copy destination of host-valid data is not referred to. However, the valid data may be copied to a free area of one processing target area or may be dividedly copied to free area of a plurality of processing target areas.

As explained above, according to the first embodiment of the present invention, the SSD 100 includes the delete notification buffer 22 that accumulates and stores a delete notification that designates unnecessary write data. The SSD 100 is configured to collectively read out a plurality of delete notifications accumulated and stored in the delete notification buffer 22, collectively invalidate write data for each processing unit area included in the storage region 11 respectively designated by the read-out delete notifications, copy write data stored in one processing unit area excluding write data to be invalidated to another processing unit area when the write data related to the one processing unit area is invalidated, and invalidate all of the data stored in the entire processing unit area at a copy source. Therefore, because the delete notifications can be processed at a time, it is possible to reduce a fall in transfer speed compared with transfer speed in sequentially processing delete notifications even if a frequency of generation of delete notifications increases. Because occurrence of fragmentation of a free area is reduced as much as possible, it is possible to prevent a decrease in time related to reading of data from and writing of data in the NAND memory 10. Further, because fragmentation of a free area is suppressed as much as possible, the wear leveling can be efficiently executed. As a result, it is possible to improve reliability of the memory system.

The host I/F controller 32 is configured to store a received delete notification in the delete notification buffer 22 reply the acknowledgement of the delete notification to the host apparatus 200 every time the delete notification is received. Therefore, time until the host apparatus 200 receives the acknowledgement of the delete notification is short compared with time required when the host I/F controller 32 is configured to transmit the acknowledgement of the delete notification after processing the delete notification. Therefore, it is possible to improve transfer efficiency between the SSD 100 and the host apparatus 200.

Because the processing unit area includes one or more blocks, it is possible to efficiently generate an empty block. Therefore, it is possible to efficiently execute the wear leveling. As a result, it is possible to improve reliability of the memory system.

Second Embodiment

According to the ATA standard, a STANDBY command for shift to a standby mode is defined. According to a second embodiment processing of delete notifications is executed when the STANDBY command is received.

The configuration of an SSD according to the second embodiment is same as that in the first embodiment except that a function of a delete notification processing unit is different. Therefore, the delete notification processing unit in the second embodiment is denoted by reference numeral 46 and other components are denoted by reference numerals and signs same as those in the first embodiment and explained.

Figure 14:
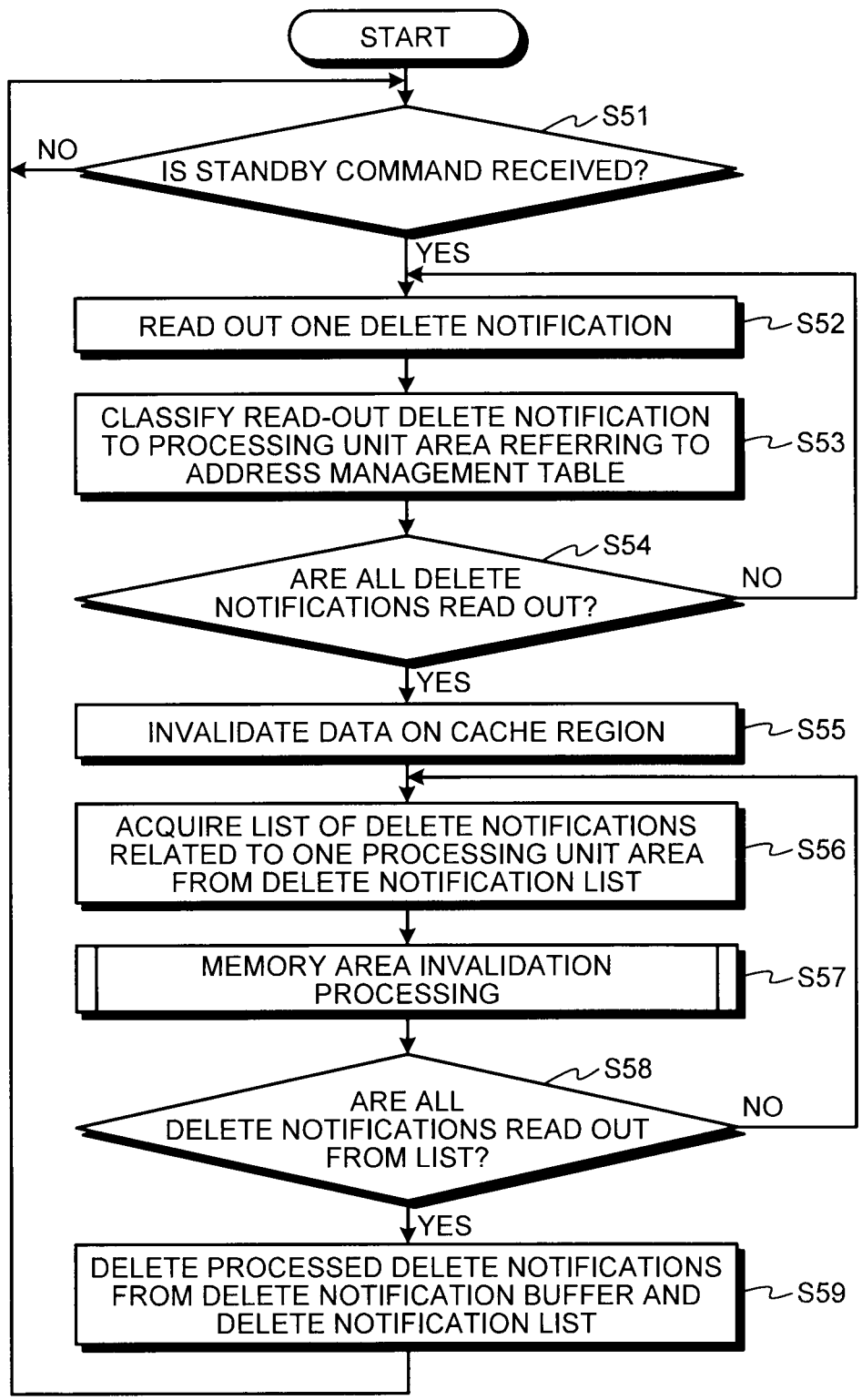
FIG. 14 is a flowchart for explaining the operation of an SSD according to a second embodiment in processing a delete notification.

FIG. 14 is a flowchart for explaining the operation of the SSD according to the second embodiment in processing a delete notification. As shown in the figure, the delete notification processing unit 46 determines whether the STANDBY command is received from the host apparatus 200 (step S51). When the STANDBY command is not received (No at step S51), the delete notification processing unit 46 shifts to step S51 and repeats the determination processing until the STANDBY command is received. When the STANDBY command is received (Yes at step S51), the delete notification processing unit 46 reads out one delete notification from the delete notification buffer 22 (step S52). Thereafter, at steps S52 to S59, the delete notification processing unit 46 executes processing same as the processing by the delete notification processing unit 36 at steps S32 to S39.

According to the ATA standard, a IDLE command for shift to a IDLE mode is defined. According to a second embodiment, processing of delete notifications may be executed when the IDLE command is received. The processing of delete notifications may be executed while being triggered by not only the STANDBY command but also the IDLE command for shift to the idle state.

According to the ATA standard, a SLEEP command for shift to a SLEEP mode is defined. According to a second embodiment, processing of delete notifications may be executed when the SLEEP command is received. The processing of delete notifications may be executed while being triggered by not only the STANDBY command but also the SLEEP command for shift to the idle state.

According to the SATA standard, a low power consumption mode such as PARTIAL or SLUMBER is standardized. When the host apparatus 200 does not perform access for a fixed time, the host apparatus 200 may issue a command for shift to the low power consumption mode (HIPM). In the second embodiment, the processing of delete notifications may be executed while being triggered by not only the STANDBY command but also the command for shift to the low power state.

According to the SATA standard, a low power consumption mode such as PARTIAL or SLUMBER is standardized. When the SSD 100 does not perform processing for a fixed time, the SSD 100 may issue a command for shift to the low power consumption mode (DIPM). In the second embodiment, the processing of delete notifications may be executed while being triggered by not only the STANDBY command but also the command for shift to the low power state.

As explained above, according to the second embodiment of the present invention, the processing of delete notifications is started when a request to shift to the standby state or a low power state is received from the host apparatus 200, or when a request to shift to a low power state is transferred to the host apparatus 200. Therefore, the processing of delete notifications is collectively executed when transfer of data is not executed between the SSD 100 and the host apparatus 200. As a result, it is possible to improve transfer efficiency between the SSD 100 and the host apparatus 200.

According to a third embodiment, processing of delete notifications is executed when a fixed time elapses after reading and writing of data is performed last according to a request from the host apparatus 200. The configuration of an SSD according to the third embodiment is same as that in the first embodiment except that a function of a delete notification processing unit is different. Therefore, the delete notification processing unit in the third embodiment is denoted by reference numeral 56 and other components are denoted by reference numerals and signs same as those in the first embodiment and explained.

The delete notification processing unit 56 counts an elapsed time after the transfer processing unit 35 executes reading and writing corresponding to a request from the host apparatus 200. After a fixed time elapses, the delete notification processing unit 56 executes processing of delete notifications accumulated in the delete notification buffer 22.

Figure 15:
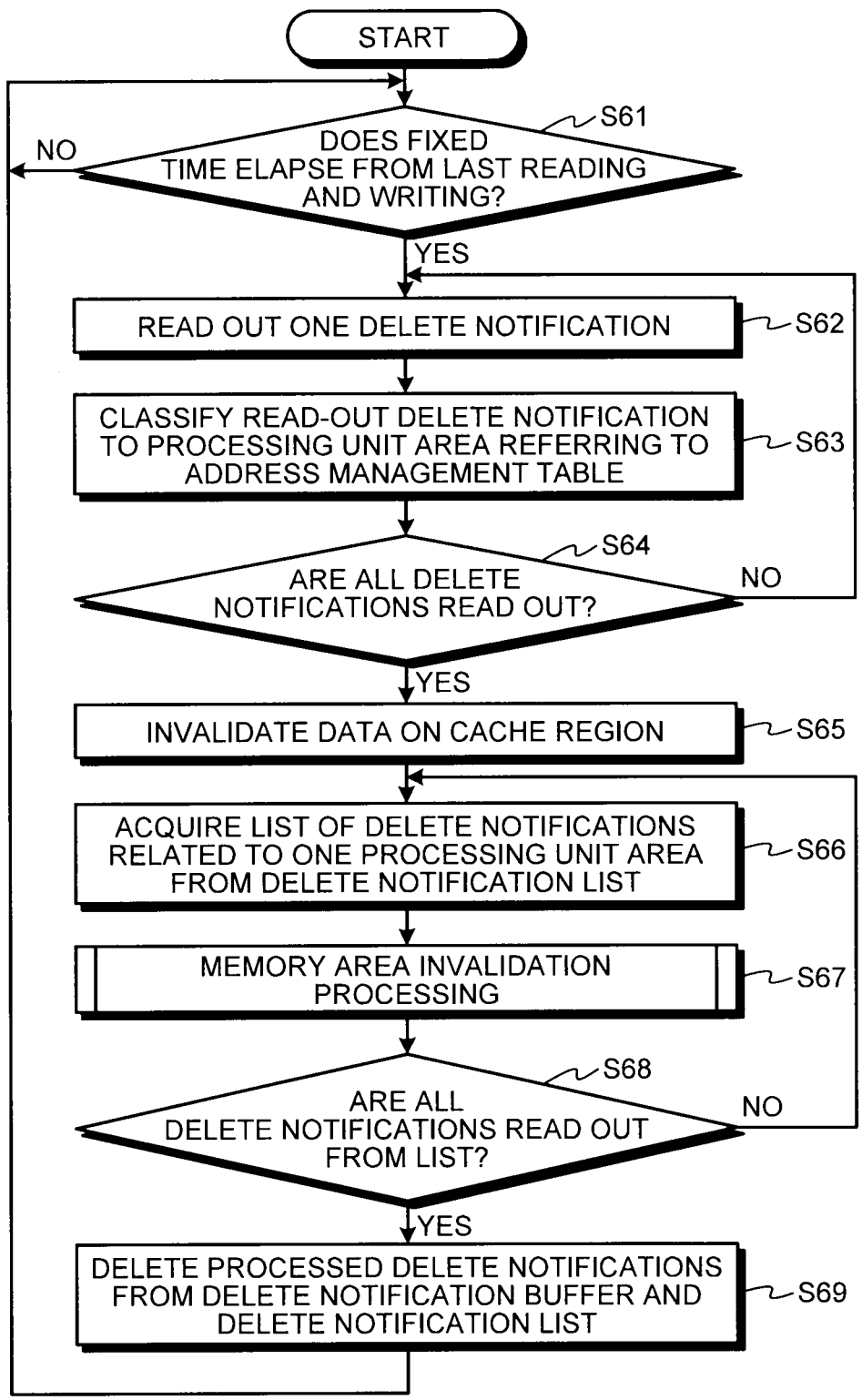
FIG. 15 is a flowchart for explaining the operation of an SSD according to a third embodiment in processing a delete notification.

FIG. 15 is a flowchart for explaining the operation of the SSD according to the third embodiment in processing a delete notification. As shown in the figure, the delete notification processing unit 56 determines whether a fixed time elapses from the last reading and writing (i.e., the last access from the host apparatus 200, or the last access to NAND memory 10) without execution of the next reading and writing (step S61). When the fixed time does not elapse (No at step S61), the delete notification processing unit 56 shifts to step S61 and repeats the determination processing until the fixed time elapses. When the fixed time elapses after the last reading and writing without execution of the next reading and writing (Yes at step S61), the delete notification processing unit 56 reads out one delete notification from the delete notification buffer 22 (step S62). Thereafter, at steps S62 to S69, the delete notification processing unit 56 executes processing same as the processing by the delete notification processing unit 36 at steps S32 to S39.

As explained above, according to the third embodiment of the present invention, the processing of delete notifications is started when there is no access from the host apparatus 200 for the fixed time or more or when there is no access to the NAND memory 10 for the fixed time or more. Therefore, the processing of delete notifications is collectively executed when transfer of data is not executed between the SSD 100 and the host apparatus 200. As a result, it is possible to improve transfer efficiency between the SSD 100 and the host apparatus 200.

As in the first embodiment, contents of the RAM need to be saved in a NAND memory or the like which is a nonvolatile memory during power off or the like to prevent losing data in a system in which management information represented by an address management table and a cache are stored on a RAM which is a volatile memory. An SSD according to a fourth embodiment executes processing of delete notifications at timing when contents of a RAM is saved (saving operation). The configuration of the SSD according to the fourth embodiment is same as that in the first embodiment except that a function of a delete notification processing unit is different. Therefore, the delete notification processing unit in the fourth embodiment is denoted by reference numeral 66 and other components are denoted by reference numerals and signs same as those in the first embodiment and explained.

The delete notification processing unit 66 monitors a flag to start the saving operation in the arithmetic unit 31. When the flag is on, the delete notification processing unit 66 executes processing of delete notifications accumulated in the delete notification buffer 22.

Figure 16:
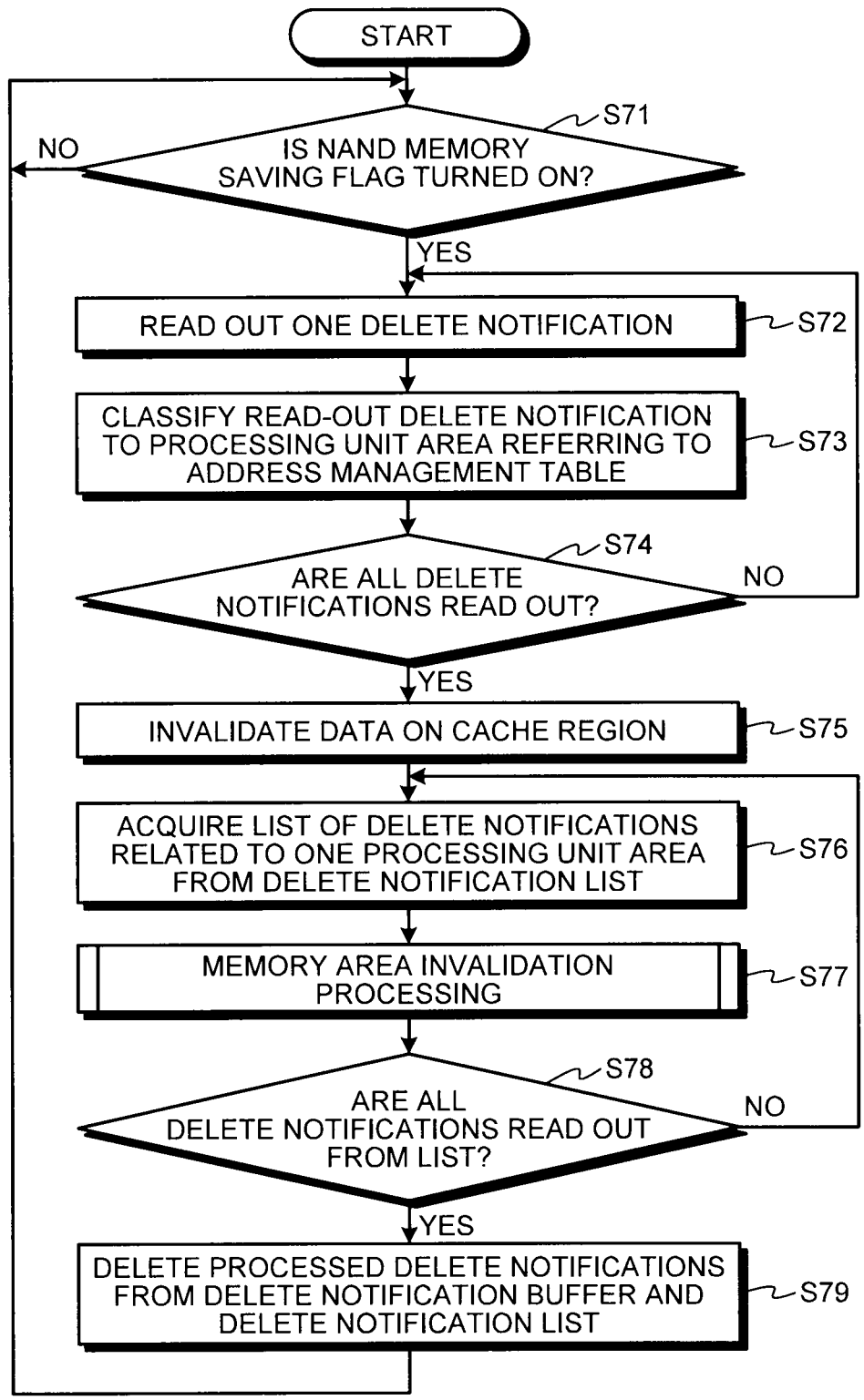
FIG. 16 is a flowchart for explaining the operation of an SSD according to a fourth embodiment in processing a delete notification.

FIG. 16 is a flowchart for explaining the operation of the SSD according to the fourth embodiment in processing a delete notification. As shown in the figure, the delete notification processing unit 66 monitors the flag to start the saving operation and determines whether the flag is on (step S71). When the flag is not on (No at step S71), the delete notification processing unit 66 shifts to step S71 and repeats the determination processing until the flag is turned on. When the flag to start the saving operation is on (Yes at step S71), the delete notification processing unit 66 reads out one delete notification from the delete notification buffer 22 (step S72). Thereafter, at steps S72 to S79, the delete notification processing unit 66 executes processing same as the processing by the delete notification processing unit 36 at steps S32 to S39.

As explained above, according to the fourth embodiment, the SSD is configured to execute collective readout of delete notifications from the delete notification buffer 22 when saving of the address management table 23 or the like is performed. Delete notifications may be processed when a fixed time elapses after saving of the address management table 23 or the like is performed.

According to a fifth embodiment, an SSD executes processing of delete notifications when a fixed time elapses after executing processing of delete notifications last. The configuration of the SSD according to the fifth embodiment is same as that in the first embodiment except that a function of a delete notification processing unit is different. Therefore, the delete notification processing unit in the fifth embodiment is denoted by reference numeral 76 and other components are denoted by reference numerals and signs same as those in the first embodiment and explained.

The delete notification processing unit 76 counts an elapsed time after execution of processing delete notifications. When the fixed time elapses after the processing delete notification is executed last time, the delete notification processing unit 76 executes processing of delete notifications accumulated in the delete notification buffer 22.

Figure 17:
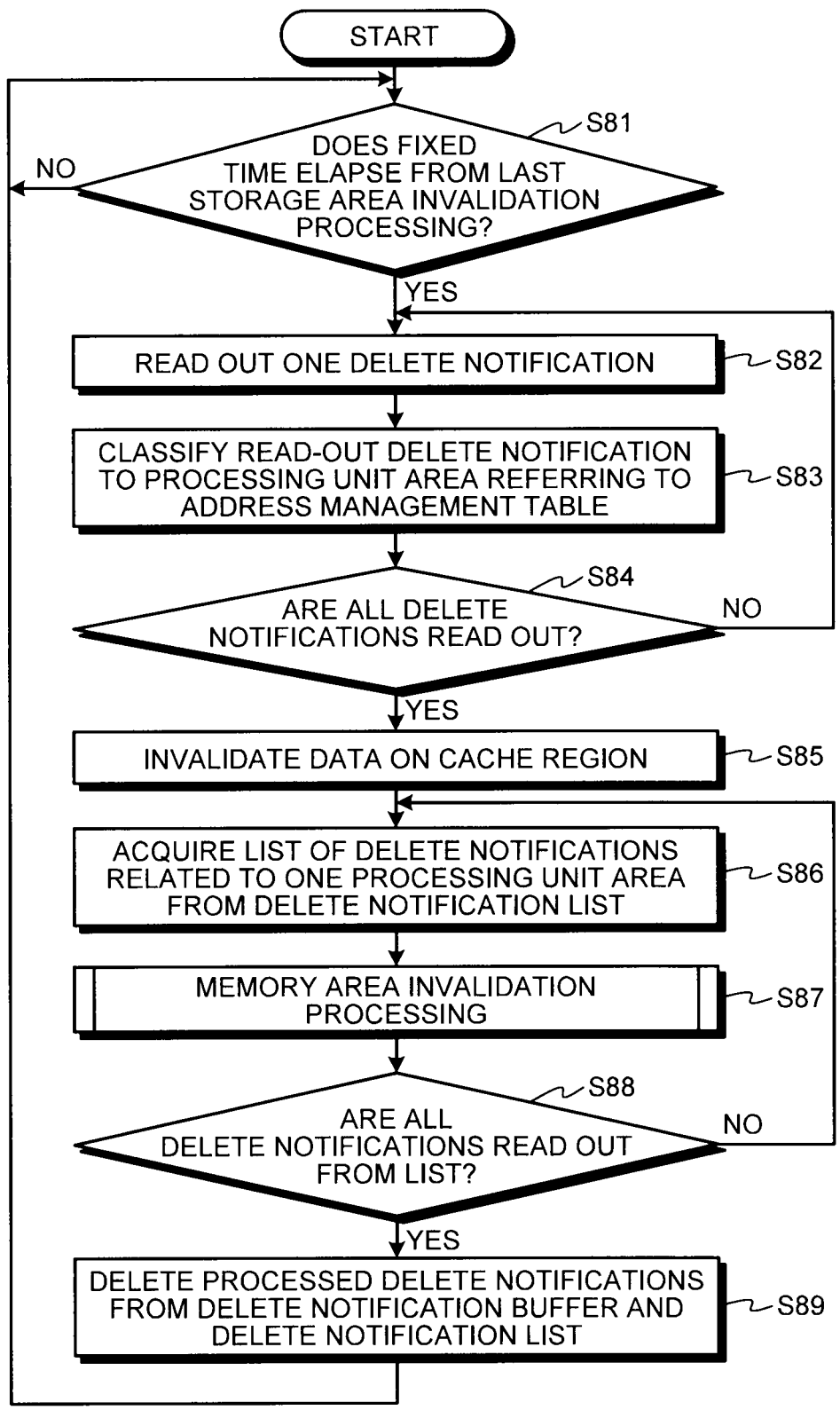
FIG. 17 is a flowchart for explaining the operation of an SSD according to a fifth embodiment in processing a delete notification.

FIG. 17 is a flowchart for explaining the operation of the SSD according to the fifth embodiment in processing a delete notification. As shown in the figure, the delete notification processing unit 76 determines whether the fixed time elapses after the last processing of delete notifications is executed (step S81). When the fixed time does no elapse (No at step S81), the delete notification processing unit 76 shifts to step S81 and repeats the determination processing until the fixed time elapses. When the fixed time elapses after the last processing of delete notifications is executed (Yes at step S81), the delete notification processing unit 76 reads out one delete notification from the delete notification buffer 22 (step S82). Thereafter, at steps S82 to S89, the delete notification processing unit 76 executes processing same as the processing by the delete notification processing unit 36 at steps S32 to S39.

As explained above, according to the fifth embodiment of the present invention, the SSD is configured to execute collective readout of delete notifications from the delete notification buffer 22 when the fixed time elapses after invalidation of write data is performed last.

In the first to fifth embodiments, trigger conditions for performing collective readout of delete notifications (i.e., processing of delete notifications) are different from one another. A plurality of trigger conditions among the trigger conditions explained in the first to fifth embodiments may be combined.

According to a sixth embodiment, an SSD does not perform invalidation of data stored in the invalidation target areas when there are not many invalidation target areas included in a processing target area. The configuration of the SSD according to the sixth embodiment is same as that in the first embodiment except that a function of a delete notification processing unit is different. Therefore, the delete notification processing unit in the sixth embodiment is denoted by reference numeral 86 and other components are denoted by reference numerals and signs same as those in the first embodiment and explained.

Figure 18:
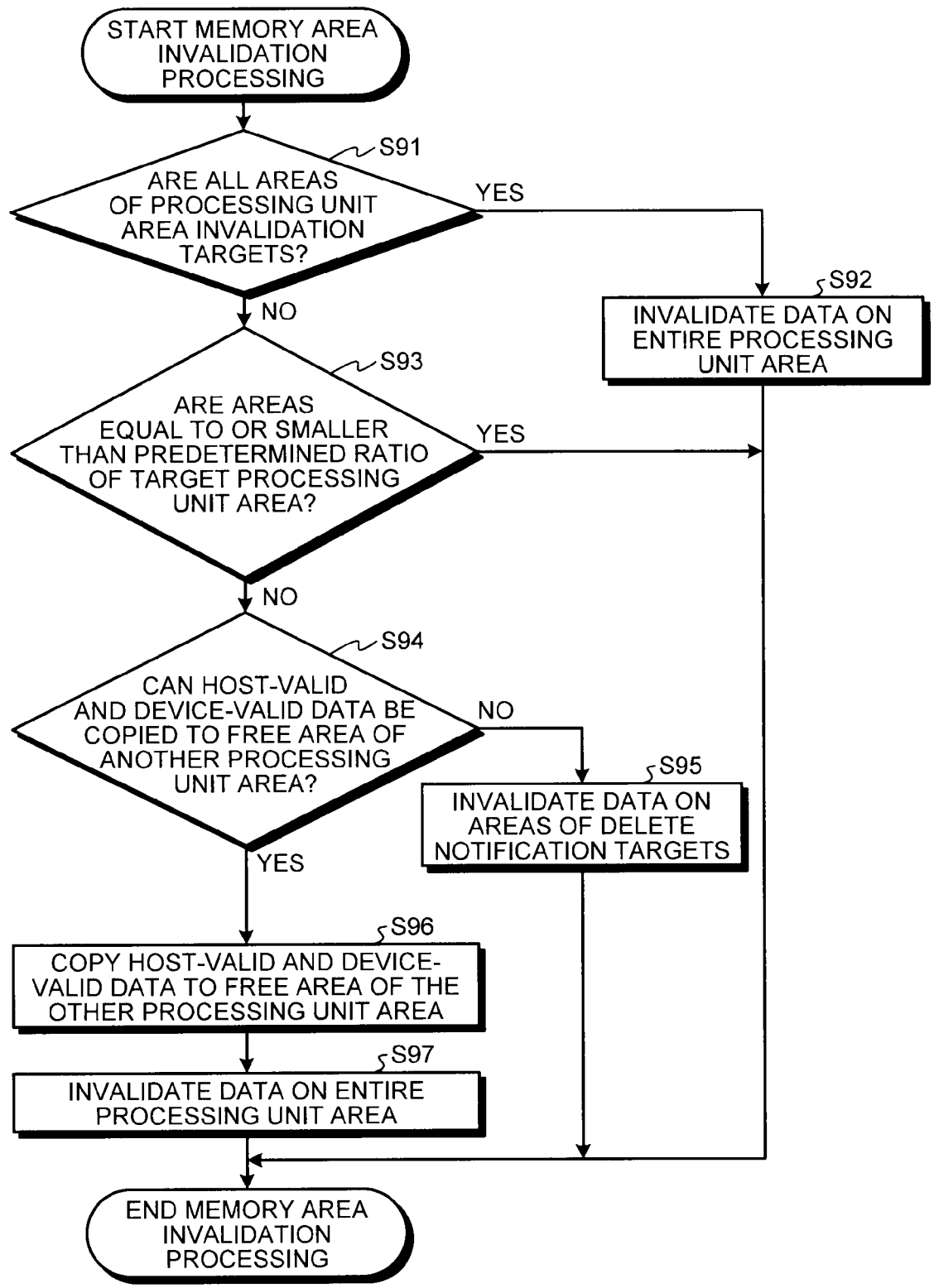
FIG. 18 is a flowchart for explaining memory area invalidation processing in an SSD according to a sixth embodiment.

FIG. 18 is a flowchart for explaining memory area invalidation processing in the SSD according to the sixth embodiment. As shown in the figure, the delete notification processing unit 86 determines whether all of the data of the entire area of a target processing unit area (in the explanation of FIG. 18, referred to as relevant processing unit area) are included in invalidation targets (step S91). When all of the data stored in the entire areas of the relevant processing unit area (target processing unit area) are invalidation targets (Yes at step S91), the delete notification processing unit 86 invalidates all of the data stored in the entire relevant processing unit area (step S92) and the memory area invalidation processing ends.

When a part of the relevant processing unit area is an invalidation target at step S91 (No at step S91), the delete notification processing unit 86 determines whether delete designation areas are equal to or smaller than a predetermined ratio of the target processing unit area (i.e., invalidation targets) (step S93). When the invalidation target areas equal to or smaller than the predetermined ratio of the target processing unit area (Yes at step S93), the memory area invalidation processing ends. The ratio used in the determination processing at step S93 may be set according to a standard same as that in the first embodiment.

When invalidation target areas are exceeding the predetermined ratio of the target processing unit area (No at step S93), the delete notification-processing unit 86 determines whether data not to be invalidated (host-valid data) in the target processing unit area can be copied to free areas of other processing unit areas by referring to the free area information 24 (step S94). When the host-valid data cannot be copied (No at step S94), the delete notification processing unit 86 invalidates data stored in the invalidation target areas of the target processing unit area (step S95). When the host-valid data can be copied (Yes at step S94), the delete notification processing unit 86 copies the host-valid data to the free area of other processing target areas (step S96) and invalidates all of the data stored in the entire area of the target processing unit area (step S97) and the memory area invalidation processing ends.

As explained above, according to the sixth embodiment of the present invention, the SSD is configured to skip copying of the write data to be copied and invalidation of the write data to be invalidated when the size of an invalidation area (i.e., the size of write data to be invalidated) is equal to or smaller than the predetermined ratio of the size of the processing unit area. Therefore, it is possible to reduce overhead related to the invalidation of the write data. As a result, it is possible to improve transfer efficiency of the memory system.

In the above explanation, the example in which the sixth embodiment is applied to the first embodiment is explained. However, it goes without saying that the sixth embodiment may also be applied to the second to fifth embodiments.

According to a seventh embodiment, an SSD does not perform invalidation when an area to which host-valid data is copied cannot be provided. The configuration of the SSD according to the seventh embodiment is same as that in the first embodiment except that a function of a delete notification processing unit is different. Therefore, the delete notification processing unit in the seventh embodiment is denoted by reference numeral 96 and other components are denoted by reference numerals and signs same as those in the first embodiment and explained.

Figure 19:
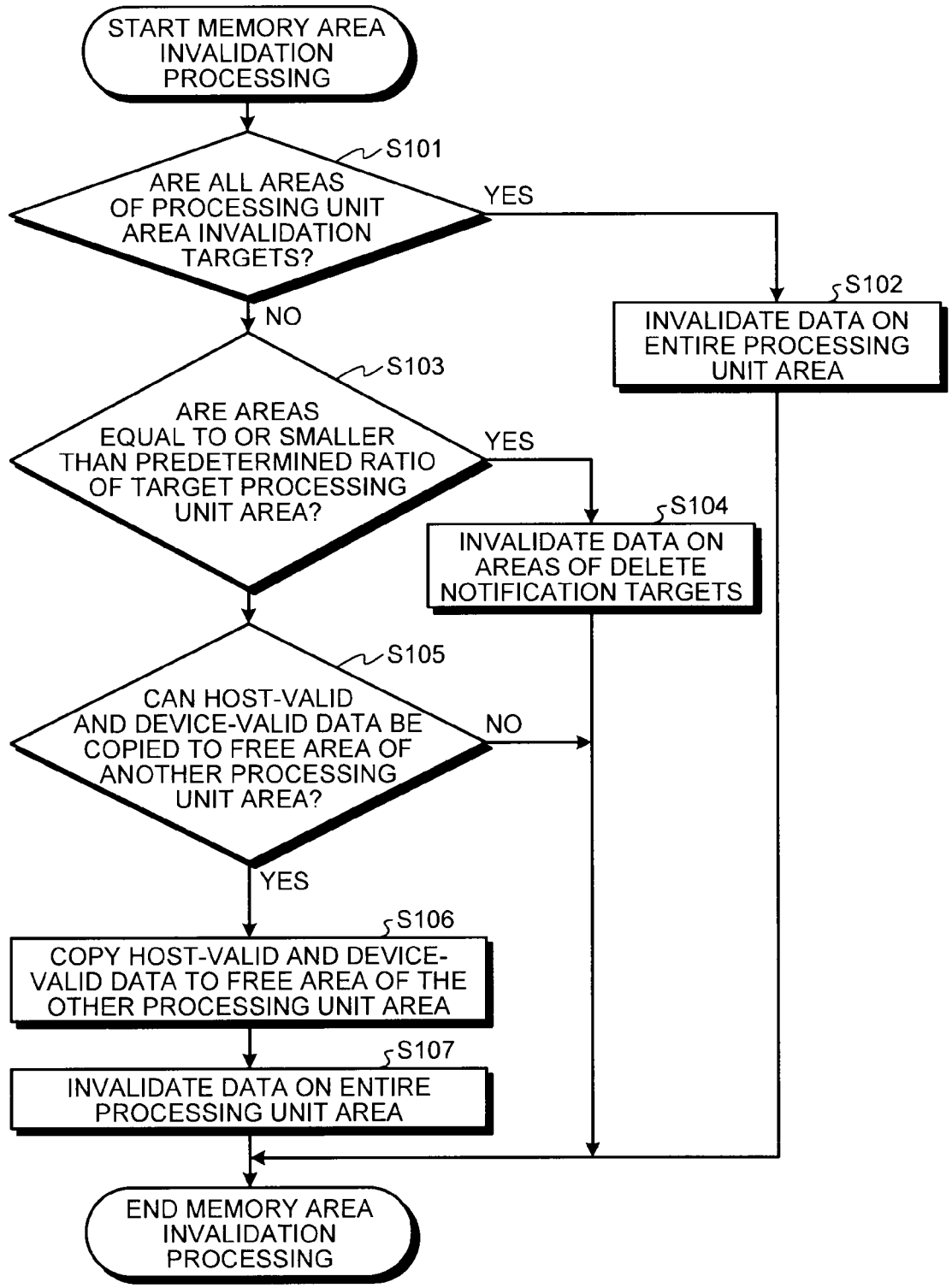
FIG. 19 is a flowchart for explaining memory area invalidation processing in an SSD according to a seventh embodiment.

FIG. 19 is a flowchart for explaining memory area invalidation processing in the SSD according to the seventh embodiment. As shown in the figure, the delete notification processing unit 96 determines whether all of the data of a target processing unit area (in the explanation of FIG. 19, referred to as relevant processing unit area) are set as invalidation targets (step S101). When all the areas of the target processing unit area are invalidation targets (Yes at step S101), the delete notification processing unit 96 invalidates data stored in the entire relevant processing unit area (step S102) and the memory area invalidation processing ends.

When a part of the target processing unit area is an invalidation target at step S101 (No at step S101), the delete notification processing unit 96 determines whether invalidation target areas are equal to or smaller than a predetermined ratio of the relevant processing unit area (step S103). When the invalidation target areas are equal to or smaller than the predetermined ratio of the relevant processing unit area (Yes at step S103), the delete notification processing unit 96 invalidates data stored in the invalidation target areas of the relevant processing unit area (step S104) and the memory area invalidation processing ends. It is advisable to set the ratio used in the determination processing at step S103 according to a standard same as that in the first embodiment.

When invalidation target areas exceed the predetermined ratio of the relevant processing unit area (No at step S103), the delete notification-processing unit 96 determines whether data not to be invalidated (host-valid data) in the target processing unit area can be copied to free areas of other processing unit areas by referring to the free area information 24 (step S105). When the host-valid data cannot be copied (No at step S105), the memory area invalidation processing ends. When the host-valid data can be copied (Yes at step S105), the delete notification processing unit 86 copies the host-valid data to the free area of other processing target areas (step S96) and invalidates all of the data stored in the entire area of the target processing unit area (step S106) and invalidates data stored in all of the data stored in the entire area of the target processing unit area (step S107) and the memory area invalidation processing ends.

As explained above, according to the seventh embodiment of the present invention, the SSD is configured to skip copying of the write data to be copied and invalidation of the write data to be invalidated when the host-valid data cannot be copied to free areas in other processing unit areas because the total size of the free areas are not enough. Therefore, it is possible to reduce overhead related to the invalidation of the write data when the host-valid data cannot be copied to free areas in other processing unit areas because the total size of the free areas are not enough. As a result, it is possible to improve transfer efficiency of the memory system.

In the above explanation, the example in which the seventh embodiment is applied to the first embodiment is explained. However, it goes without saying that the seventh embodiment may also be applied to the second to sixth embodiments.

According to an eighth embodiment, an SSD does not perform invalidation and reduces overhead related to the invalidation when there is room in a free area of the storage region 11 and performs invalidation and prevent shortage of the free area due to the existence of host-invalid data when there is no room in the free area. The configuration of the SSD according to the eighth embodiment is same as that in the first embodiment except that a function of a delete notification processing unit is different. Therefore, the delete notification processing unit in the eighth embodiment is denoted by reference numeral 106 and other components are denoted by reference numerals and signs same as those in the first embodiment and explained.

Figure 20:
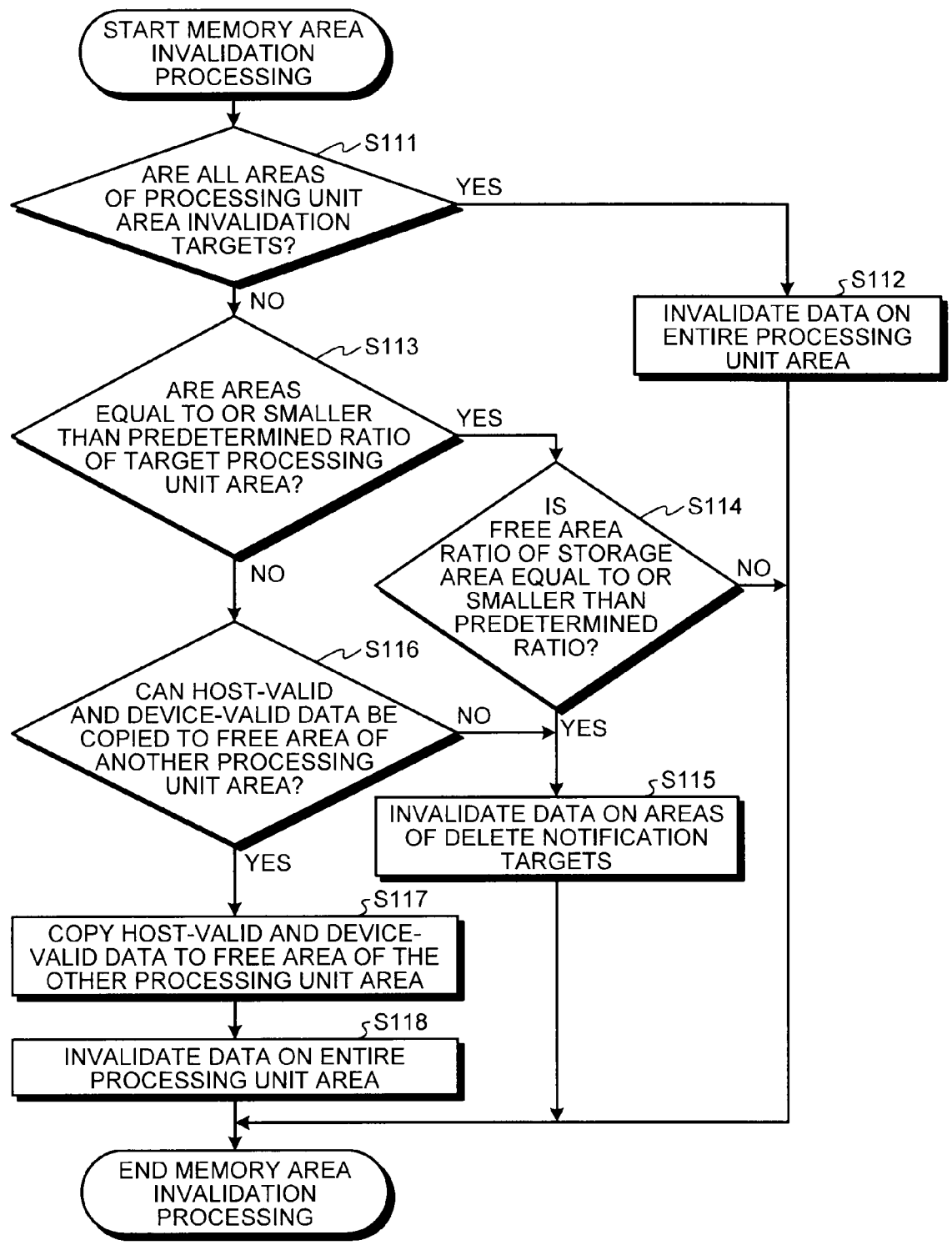
FIG. 20 is a flowchart for explaining memory area invalidation processing in an SSD according to an eighth embodiment.

FIG. 20 is a flowchart for explaining memory area invalidation processing in the SSD according to the eighth embodiment. As shown in the figure, the delete notification processing unit 106 determines whether all of the data of a target processing unit area (in the explanation of FIG. 20, referred to as relevant processing unit area) are set as invalidation targets (step S111). When all of the data of the target processing unit area are invalidation targets (Yes at step S111), the delete notification processing unit 106 invalidates data stored in all of the data stored in the entire area of the relevant processing unit area (step S112) and the memory area invalidation processing ends.

When a part of the relevant processing unit area is an invalidation target at step S111 (No at step S111), the delete notification processing unit 106 determines whether invalidation target areas are equal to or smaller than a predetermined ratio of the relevant processing unit area (step S113). It is advisable to set the ratio used in the determination processing at step S113 according to a standard same as that in the first embodiment.

When invalidation target areas are equal to or smaller than the predetermined ratio of the relevant processing unit area (Yes at step S113), the delete notification processing unit 106 determines whether a ratio of a free area to the storage region 11 is equal to or smaller than a predetermined ratio by referring to the free area information 24 (step S114). The ratio used in the determination at step S114 may be set in any way. When the ratio of the free area exceeds the predetermined ratio (No at step S114), the memory area invalidation processing ends. When the ratio of the free area is equal to or smaller than the predetermined ratio (Yes at step S114), the delete notification processing unit 106 invalidates the invalidation target areas of the processing unit area (step S115) and the memory area invalidation processing ends.

When invalidation target areas exceed the predetermined ratio of the relevant processing unit area (No at step S113), the delete notification processing unit 106 determines whether data not to be invalidated (host-valid data) in the target processing unit area can be copied to free areas of other processing unit areas by referring to the free area information 24 (step S116). When the host-valid data cannot be copied (No at step S116), the delete notification processing unit 106 shifts to step S115 and invalidates data stored in the invalidation target areas of the target processing unit area. When the host-valid data can be copied (Yes at step S116), the delete notification processing unit 106 copies the host-valid data to the free area of other processing target areas (step S117) and invalidates all of the data stored in the entire area of the target processing unit area (step S118) and the memory area invalidation processing ends.

As explained above, according to the eighth embodiment of the present invention, the SSD is configured to determine, whether there is room in a free area of the storage region 11, whether write data is invalidated. Therefore, it is possible to reduce overhead related to the invalidation of the write data when there is room in the free area and perform invalidation when there is no room in the free area. Therefore, it is possible to improve transfer efficiency of the memory system.

In the above explanation, the example in which the eighth embodiment is applied to the sixth embodiment is explained. However, it goes without saying that the eighth embodiment may also be applied to the seventh embodiment.

In the memory area invalidation processing in the first to eighth embodiments, after undergoing the determination step (step S43, etc.) for determining whether areas exceeding the predetermined ratio of the processing unit area are invalidation targets, the delete notification processing unit shifts to the determination step (step S45, etc.) for determining whether data not to be invalidated (host-valid data) in the target processing unit area can be copied to free areas of other processing unit areas because the total size of the free areas are enough much. In a ninth embodiment, an area used for the determination in the former determination step is a total area of the invalidation target areas and an area already invalidated rather than invalidation target areas. In other words, in the ninth embodiment, when a ratio of device-valid data remaining after invalidation is small, a delete notification processing unit shifts to the latter determination step.

The configuration of an SSD according to the ninth embodiment is same as that in the first embodiment except that a function of a delete notification processing unit is different. Therefore, the delete notification processing unit in the ninth embodiment is denoted by reference numeral 116 and other components are denoted by reference numerals and signs same as those in the first embodiment and explained.

Figure 21:
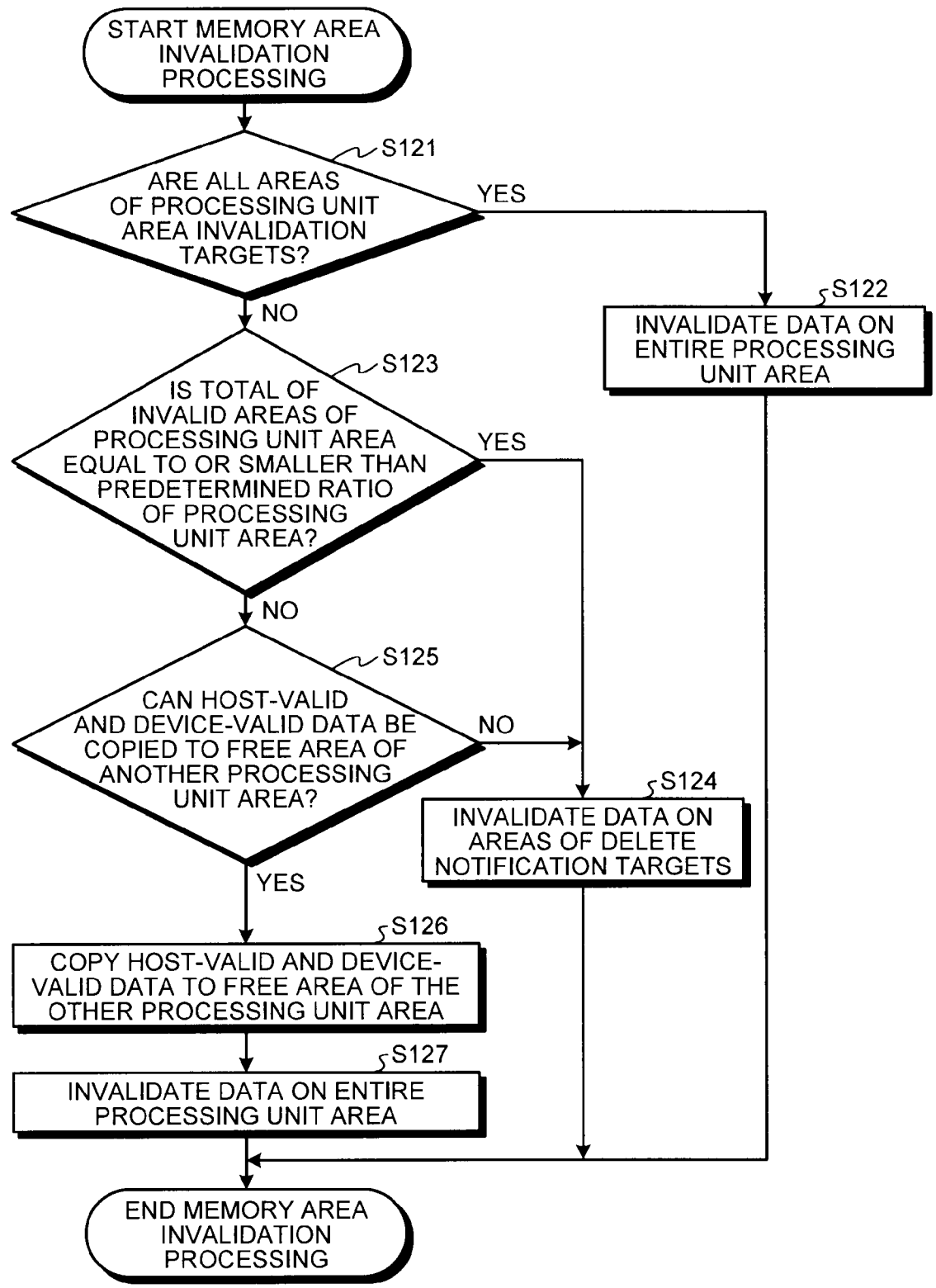
FIG. 21 is a flowchart for explaining memory area invalidation processing in an SSD according to a ninth embodiment.

FIG. 21 is a flowchart for explaining memory area invalidation processing in the SSD according to the ninth embodiment. As shown in the figure, the delete notification processing unit 116 determines whether all of the data of a target processing unit area (in the explanation of FIG. 21, referred to as relevant processing unit area) are set as invalidation targets (step S121). When all the areas of the target processing unit area are invalidation targets (Yes at step S121), the delete notification processing unit 116 invalidates all of the data stored in the entire relevant processing unit area (step S122) and the memory area invalidation processing ends.

When a part of the relevant processing unit area is an invalidation target at step S121 (No at step S121), the delete notification processing unit 116 determines whether a ratio of a total area of the invalidation target areas and an area already invalidated is equal to or smaller than a predetermined ratio of the relevant processing unit area (step S123). When the predetermined ratio is used in the determination processing at step S123, it is advisable to set the predetermined ratio according to a standard same as that in the first embodiment. When the ratio of the total area of the invalidation target areas and the area already invalidated is equal to or smaller than the predetermined ratio of the relevant processing unit area (Yes at step S123), the delete notification processing unit 116 invalidates data stored in the invalidation target areas of the target processing unit area (step S124) and the memory area invalidation processing ends.

When the ratio of the total area of the invalidation target areas and the area already invalidated exceeds the predetermined ratio of the relevant processing unit area (No at step S123), the delete notification processing unit 116 determines whether data not to be invalidated (host-valid data) in the target processing unit area can be copied to free areas of other processing unit areas by referring to the free area information 24 (step S125). When the host-valid data cannot be copied because the total size of the free areas are not enough (No at step S125), the delete notification processing unit 116 shifts to step S124 and invalidates data stored in the invalidation target areas of the target processing unit area. When the host-valid data can be copied (Yes at step S125), the delete notification processing unit 116 copies the host-valid data to the free area of other processing target areas (step S126) and invalidates all of the data stored in the entire area of the target processing unit area and the memory area invalidation processing ends (step S127) and the memory area invalidation processing ends.

As explained above, for the determination of whether copying of write data and invalidation of the entire processing unit area are executed a ratio of the size of that total area of the invalidation target areas and the area already invalidated to the processing unit area may also be used rather than a ratio of the invalidation target areas.

According to a tenth embodiment, the memory area invalidation processing is not applied to a processing unit area in which the number of times of erasing reaches a predetermined value to extend the life of a NAND memory as long as possible.

The configuration of an SSD according to the tenth embodiment is same as that in the first embodiment except that a function of a delete notification processing unit is different. Therefore, the delete notification processing unit in the tenth embodiment is denoted by reference numeral 126 and other components are denoted by reference numerals and signs same as those in the first embodiment and explained.

Figure 22:
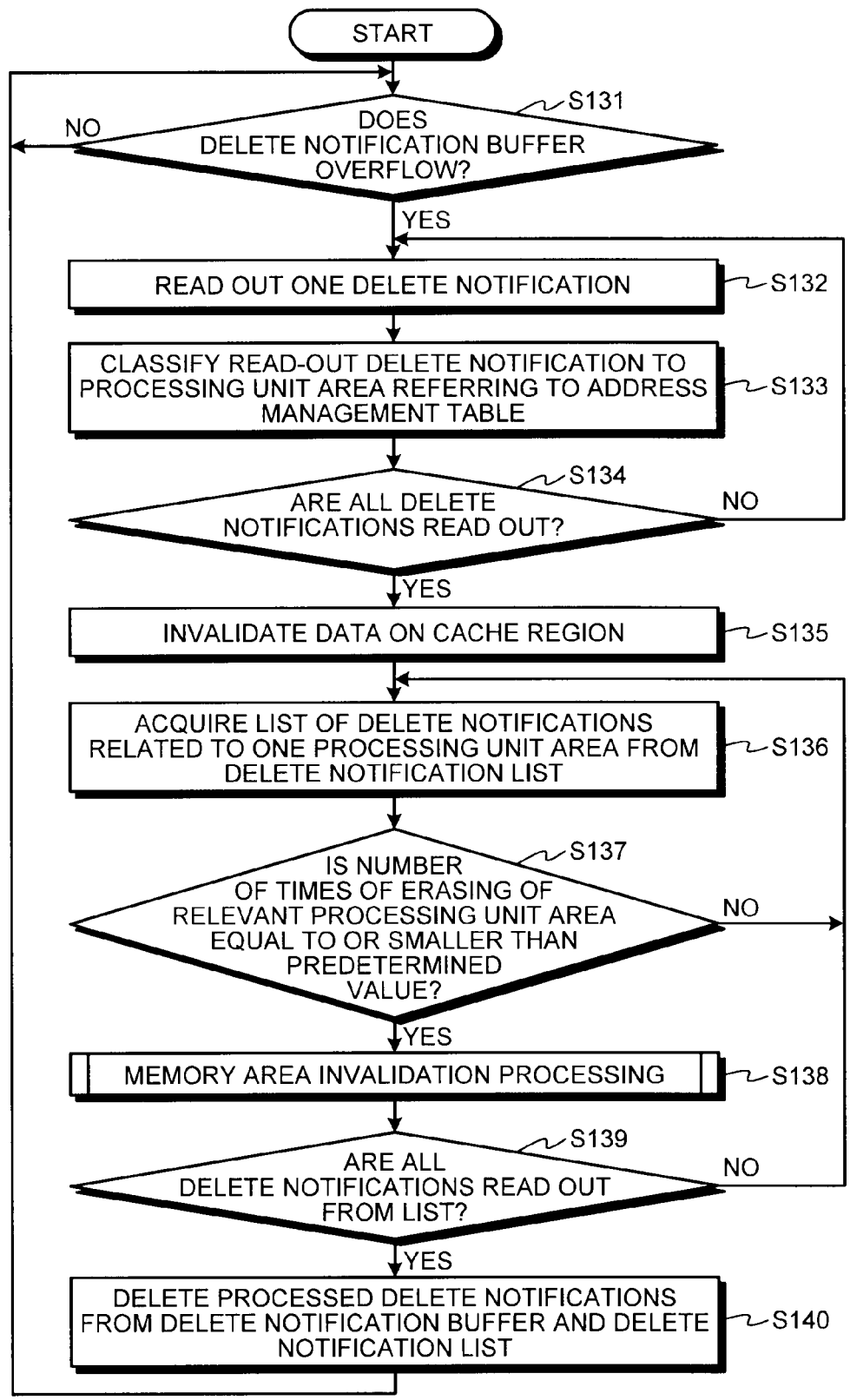
FIG. 22 is a flowchart for explaining memory area invalidation processing in an SSD according to a tenth embodiment.

FIG. 22 is a flowchart for explaining the operation of the SSD 100 according to the tenth embodiment in processing a delete notification. As shown in the figure, at steps S131 to S136, the delete notification processing unit 126 executes processing same as the processing by the delete notification processing unit 36 at steps S31 to S36. After reading out a list of delete notifications related to one processing unit area from the delete notification list 25 at step S136, the delete notification processing unit 126 inquires the transfer processing unit 35, which performs wear leveling, and determines whether a cumulative number of times of erasing of a target processing unit area is equal to or smaller than a predetermined value (step S137). The threshold in the determination at step S137 may be set in any way. When the cumulative number of times of erasing exceeds the predetermined value (No at step S137), the delete notification processing unit 126 skips memory area invalidation processing for the processing unit area and shifts to step S136. When the cumulative number of times of erasing is equal to or smaller than the predetermined value (Yes at step S137), the delete notification processing unit 126 executes the memory area invalidation processing (step S138). Thereafter, at steps S139 to S140, processing same as the processing at steps S38 to S39 is executed.

As explained above, according to the tenth embodiment of the present invention, the memory area invalidation processing is not applied to a processing unit area in which the number of times of erasing reaches the predetermined value. Therefore, it is possible to extend the life of the NAND memory 10.

In the above explanation, the example in which the tenth embodiment is applied to the first embodiment is explained. However, it goes without saying that the tenth embodiment may also be applied to the second to ninth embodiments.

According to an eleventh embodiment of the present invention, processing efficiency of invalidation is improved by skipping an invalidation operation of a delete notification which specifies areas equal to or smaller than a predetermined size as a delete designation area.

The configuration of an SSD according to the eleventh embodiment is same as that in the first embodiment except that a function of a delete notification processing unit is different. Therefore, the delete notification processing unit in the eleventh embodiment is denoted by reference numeral 136 and other components are denoted by reference numerals and signs same as those in the first embodiment and explained.

Figure 23:
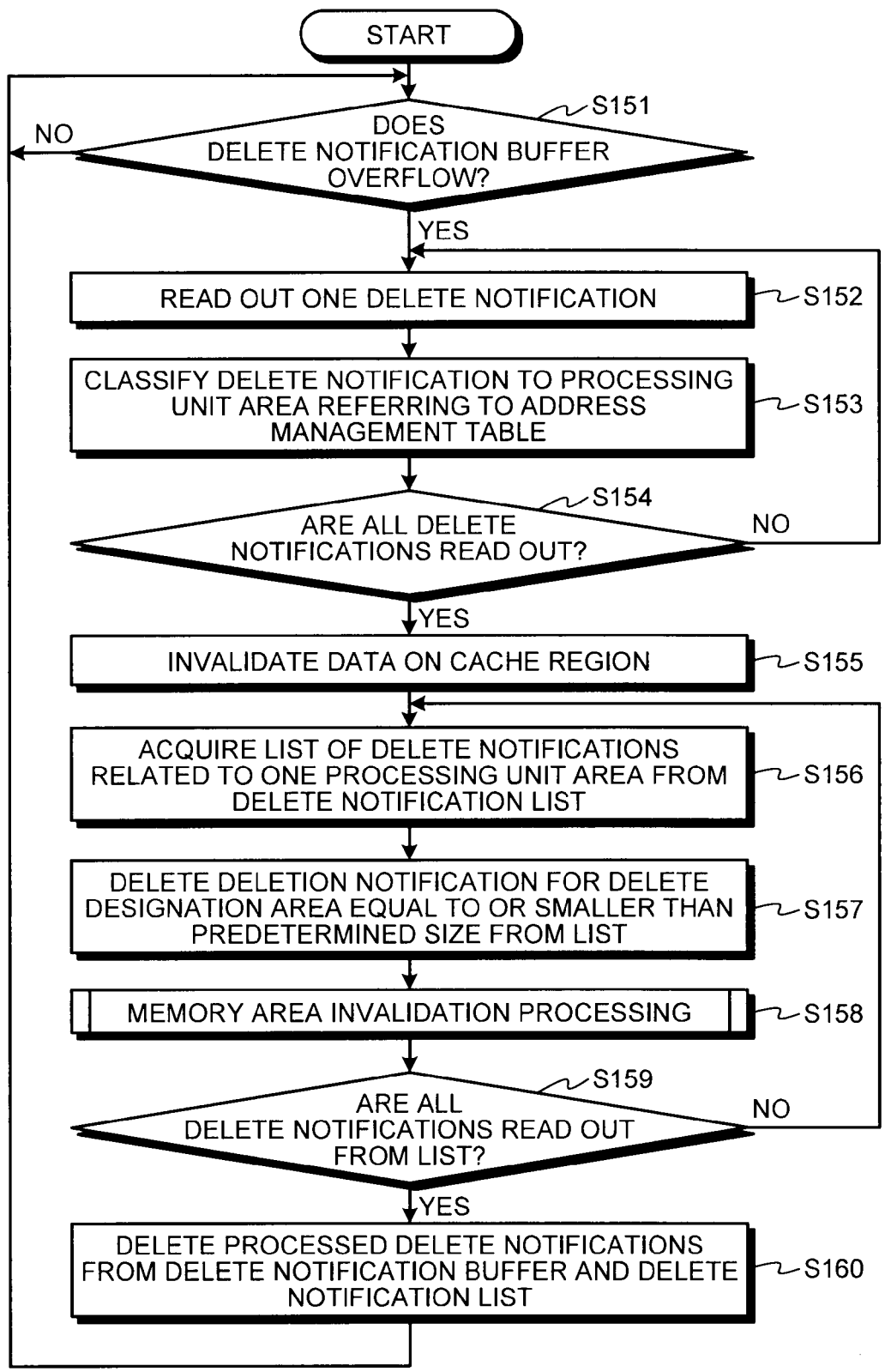
FIG. 23 is a flowchart for explaining memory area invalidation processing in an SSD according to an eleventh embodiment.

FIG. 23 is a flowchart for explaining the operation of the SSD 100 according to the eleventh embodiment in processing a delete notification. As shown in the figure, at steps S151 to S156, the delete notification processing unit 136 executes processing same as the processing by the delete notification processing unit 36 at steps S31 to S36. After reading out a list of delete notifications related to one processing unit area from the delete notification list 25 at step S156, the delete notification processing unit 136 deletes a delete notification which specifies areas equal to or smaller than a predetermined size as a delete designation area from the delete notification list 25 (step S157).

A threshold of the size used at step S157 may be determined in any way. For example, the threshold may be equal to the page size of NAND flash memory or the size obtained by subtracting ECC redundant area size from the page size. For example, it is also possible that a distribution of the number of times of notification processing with the number of logical sectors of a delete processing target of notification processing received by the SSD 100 plotted on the abscissa can be calculated by simulation or the like and the number of logical sectors equivalent to the boundary of upper 2 sigma(97.7%) in the distribution may be set as the threshold. It is also possible that the number of logical sectors of the delete processing target is accumulated and recorded in the SSD 100, the distribution is calculated based on the recorded number of logical sectors, and the threshold is dynamically calculated.

After step S157, the delete notification processing unit 136 executes memory area invalidation processing (step S158). Thereafter, at steps S159 to S160, processing same as the processing at steps S38 to S39 is executed.

As explained above, according to the eleventh embodiment of the present invention, it is possible to improve processing efficiency of invalidation by skipping invalidation operation of a delete notification which specifies areas equal to or smaller than the predetermined size as a delete designation area. It is possible to improve transfer efficiency of the memory system.

In the above explanation, the example in which the eleventh embodiment is applied to the first embodiment is explained. However it goes without saying that the eleventh embodiment may also be applied to the second to tenth embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a nonvolatile memory including a memory area;
 a transfer processing unit that stores write data received from a host apparatus in the memory area;
 a delete notification buffer that accumulates a delete notification that is received from the host apparatus and designates unnecessary write data; and
 a delete notification processing unit that collectively reads out a plurality of delete notifications accumulated in the delete notification buffer, classifies the read-out delete notifications for each unit area smaller than the memory area, and sequentially executes, for each unit area, processing for collectively invalidating write data related to one or more delete notifications classified in a same unit area and, in executing processing for one unit area in the processing sequentially executed for the each unit area, invalidates all write data stored in the one unit area after copying write data excluding write data to be invalidated stored in the one unit area to another unit area.

2. The memory system according to claim 1, wherein the delete notification processing unit invalidates the write data to be invalidated without performing copying of the write data to be copied or skips copying and invalidation of the write data related to the one unit area when a total size of a free area in other unit areas is smaller than a size of the write data to be copied.

3. The memory system according to claim 1, wherein the delete notification processing unit invalidates the write data to be invalidated without performing copying of the write data to be copied or skips copying and invalidation of the write data related to the one unit area when a size of the write data to be invalidated is smaller than a predetermined ratio of a size of the one unit area, and the delete notification processing unit performs the copying of the write data to be copied and invalidates all the write data stored in the one unit area when the size of the write data to be invalidated exceeds the predetermined ratio.

4. The memory system according to claim 1, wherein the delete notification processing unit invalidates the write data to be invalidated without performing copying of the write data to be copied or skips copying and invalidation of the write data related to the one unit area when a total of a size of the write data to be invalidated and a size of an invalid area is smaller than a predetermined ratio of a size of the one unit area, and the delete notification processing unit performs the copying of the write data to be copied and invalidates all the write data stored in the one unit area when the total of the size of the write data to be invalidated and the size of the invalid area exceeds the predetermined ratio.

5. The memory system according to claim 1, wherein the delete notification processing unit skips invalidation of write data stored in a unit area in which a predetermined number or more of times of erasing is executed.

6. The memory system according to claim 1, wherein the delete notification processing unit sets the write data as an invalidation target when a size of write data designated by a delete notification is larger than a predetermined size among the delete notifications classified for each unit area.

7. The memory system according to claim 1, wherein the delete notification unit collectively reads out the delete notifications from the delete notification buffer when the number of the delete notifications accumulated in the delete notification buffers reaches a predetermined number, when the host apparatus does not access for a fixed time or more, when a request to shift to a standby state is received from the host apparatus, when the memory system shifts to a low power mode, or when a fixed time elapses after invalidation of write data is performed last.

8. The memory system according to claim 1, further comprising a volatile memory that stores an address management table that associates a logical address used for designation of a writing destination of write data by the host apparatus and a physical address of the memory area, wherein
the delete notification processing unit collectively reads out the delete notifications from the delete notification buffer when the address management table is saved from the volatile memory to the memory area.

9. The memory system according to claim 1, further comprising a connecting section that is connected to the host apparatus and receives write data and a delete notification transmitted from the host apparatus, wherein
the connecting section stores a delete notification in the delete notification buffer every time the delete notification is received and transmits an acknowledgement to the host apparatus.

10. The memory system according to claim 1, wherein
the nonvolatile memory is a NAND flash memory, and
the unit area includes one or more erasing units of the NAND flash memory.

11. The memory system according to claim 1, wherein
the delete notification designates invalid write data at least for the host with a start address and a data size of a writing destination of the write data, and,
when write data is received anew, the transfer processing unit deletes a delete notification whose logical address area includes the writing destination area of the write data from the delete notification buffer.

12. A data deleting method in which a control circuit deletes data from a nonvolatile memory area based on a delete notification that is received from a host apparatus and designates unnecessary writing data, the data deleting method comprising:
accumulating a delete notification received from the host apparatus;
collectively reading out a plurality of the accumulated delete notifications; and
sequentially executing, for each unit area, processing for collectively invalidating write data related to one or more delete notifications classified in a same unit area, wherein
in executing processing for one unit area in the processing sequentially executed for the each unit area, invalidating all write data stored in the one unit area after copying write data excluding write data to be invalidated stored in the one unit area to another unit area.

13. The data deleting method according to claim 12, further comprising:
determining whether a total size of a free area in other unit areas is smaller than a size of the write data to be copied; and
invalidating the write data to be invalidated without performing copying of the write data to be copied or skipping copying and invalidation of the write data related to the one unit area when the total size is smaller than the size of the write data to be copied.

14. The data deleting method according to claim 12, further comprising:
determining whether a size of the write data to be invalidated is smaller than a predetermined ratio of a size of the one unit area;
invalidating the write data to be invalidated without performing copying of the write data to be copied or skips copying and invalidation of the write data related to the one unit area when a size of the write data to be invalidated is smaller than a predetermined ratio of a size of the one unit area; and
performing the copying of the write data to be copied and invalidating all the write data stored in the one unit area when the size of the write data to be invalidated exceeds the predetermined ratio.

15. The data deleting method according to claim 12, further comprising:
determining whether a total of a size of the write data to be invalidated and a size of an invalid area is smaller than a predetermined ratio of a size of the one unit area;
invalidating the write data to be invalidated without performing copying of the write data to be copied or skipping copying and invalidation of the write data related to the one unit area and when the total is smaller than the predetermined ratio; and
performing the copying of the write data to be copied and invalidating all the write data stored in the one unit area when the total exceeds the predetermined ratio.

16. The data deleting method according to claim 12, further comprising:
determines whether a cumulative number of times of erasing of processing unit areas related to the acquired list of delete notifications is equal to or smaller than a predetermined value
determining whether a cumulative number of times of erasing of a unit area exceeds a predetermined number; and
skipping invalidation of write data related to the unit area when the cumulative number exceeds the predetermined number.

17. The data deleting method according to claim 12, further comprising setting, as an invalidation target, write data having a size which is larger than a predetermined size and designated by a delete notification among the delete notifications classified for each unit area.

18. The data deleting method according to claim 12, wherein timing of collectively reading out the delete notifications from the delete notification buffer is when the delete notifications accumulated and stored in the delete notification buffers reach a predetermined number, when the host apparatus does not access for a fixed time or more, when a request for shift to a standby state is received from the host apparatus, or when a fixed time elapses after invalidation of write data is performed last.

19. The data deleting method according to claim 12, further comprising managing an address management table that associates an address used for designation of a writing destination of write data by the host apparatus and a physical address of the memory area, wherein
timing of collectively reading out the delete notifications from the delete notification buffer is when the address management table is saved from the volatile memory to the memory area.

20. The data deleting method according to claim 12, wherein
- the delete notification designates unnecessary write data with a start address and a data size of a writing destination of the write data, and
- the data deleting method further comprising deleting, when write data is received anew, a delete notification related to a writing destination of the write data from the delete notification buffer.

* * * * *